United States Patent

Duff et al.

[11] Patent Number: 6,162,571
[45] Date of Patent: Dec. 19, 2000

[54] UNSYMMETRICAL PERYLENE DIMERS

[75] Inventors: James M. Duff, Mississauga; C. Geoffrey Allen, Waterdown; Ah-Mee Hor, Mississauga; Roger E. Gaynor, Oakville, all of Canada

[73] Assignee: Xerox Corporation, Stamford, Conn.

[21] Appl. No.: 09/165,595

[22] Filed: Oct. 2, 1998

[51] Int. Cl.[7] .................................................. G03G 5/047
[52] U.S. Cl. .............................. 430/59.1; 430/56; 430/78
[58] Field of Search ................... 430/59.1, 57.3, 430/56, 78; 546/37

[56] References Cited

U.S. PATENT DOCUMENTS

| | | | |
|---|---|---|---|
| 3,904,407 | 9/1975 | Regensburger et al. | 96/1.5 |
| 3,972,717 | 8/1976 | Wiedemann | 96/1.5 |
| 3,992,205 | 11/1976 | Weidemann | 96/1.6 |
| 4,081,274 | 3/1978 | Horgan | 96/1 PC |
| 4,115,116 | 9/1978 | Stolka et al. | 96/1.5 R |
| 4,223,384 | 9/1980 | Hounsfield et al. | 364/414 |
| 4,265,990 | 5/1981 | Stolka et al. | 430/59 |
| 4,297,424 | 10/1981 | Hewitt | 430/58 |
| 4,299,897 | 11/1981 | Stolka et al. | 430/59 |
| 4,304,829 | 12/1981 | Limburg et al. | 430/59 |
| 4,306,008 | 12/1981 | Pai et al. | 430/59 |
| 4,419,427 | 12/1983 | Graser et al. | 430/58 |
| 4,429,029 | 1/1984 | Hoffmann et al. | 430/57 |
| 4,469,769 | 9/1984 | Nakazawa et al. | 430/78 |
| 4,501,906 | 2/1985 | Spietschka et al. | 549/232 |
| 4,514,482 | 4/1985 | Loutfy et al. | 430/78 |
| 4,517,270 | 5/1985 | Graser et al. | 430/58 |
| 4,555,463 | 11/1985 | Hor et al. | 430/59 |
| 4,556,622 | 12/1985 | Neumann et al. | 430/58 |
| 4,587,189 | 5/1986 | Hor et al. | 430/59 |
| 4,609,605 | 9/1986 | Lees et al. | 430/58 |
| 4,719,163 | 1/1988 | Staudenmayer et al. | 430/58 |
| 4,746,741 | 5/1988 | Staudenmayer et al. | 546/37 |
| 4,921,773 | 5/1990 | Melnyk et al. | 430/132 |
| 4,937,164 | 6/1990 | Duff et al. | 430/58 |
| 4,968,571 | 11/1990 | Gruenbaum et al. | 430/58 |
| 5,019,473 | 5/1991 | Nguyen et al. | 430/58 |
| 5,139,910 | 8/1992 | Law et al. | 430/59 |
| 5,225,307 | 7/1993 | Hor et al. | 430/136 |
| 5,645,965 | 7/1997 | Duff et al. | 430/59 |
| 5,683,842 | 11/1997 | Duff et al. | 430/59 |
| 5,693,808 | 12/1997 | Langhals | 546/37 |
| 5,929,239 | 7/1999 | Langhals et al. | 546/37 |
| 6,060,601 | 5/2000 | Langhals et al. | 546/37 |

FOREIGN PATENT DOCUMENTS

| | | |
|---|---|---|
| 0 711 812 | 5/1996 | European Pat. Off. . |
| 896 964 | 2/1999 | European Pat. Off. . |
| 59-031957 | 2/1984 | Japan . |
| 59-119356 | 7/1984 | Japan . |
| 59-119357 | 7/1984 | Japan . |
| 59-140454 | 8/1984 | Japan . |
| 59-140456 | 8/1984 | Japan . |
| 59-154454 | 9/1984 | Japan . |
| 59-157646 | 9/1984 | Japan . |
| 59-157648 | 9/1984 | Japan . |
| 59-157651 | 9/1984 | Japan . |
| WO 98 32799 | 7/1998 | WIPO . |

OTHER PUBLICATIONS

Borsenberger, Paul. Organic Photoreceptors for Imaging Systems. New York: Marcel–Dekker, Inc. pp. 6–17 & 330–338, 1993.

*Primary Examiner*—Christopher D. Rodee
*Attorney, Agent, or Firm*—E. D. Palazzo

[57] ABSTRACT

A photoconductive imaging member comprised of an unsymmetrical perylene of the formula

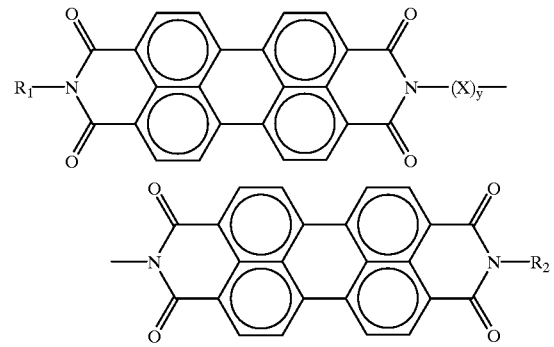

wherein each $R_1$ and $R_2$ are dissimilar and wherein the $R_1$ and $R_2$ are hydrogen, alkyl, cycloalkyl, substituted alkyl, aryl, substituted aryl, aralkyl, and substituted aralkyl, and X represents a symmetrical bridging component, and y represents the number of X components.

9 Claims, No Drawings

UNSYMMETRICAL PERYLENE DIMERS

RELATED PATENTS

There are illustrated in U.S. Pat. No. 5,645,965, the disclosure of which is totally incorporated herein by reference, photoconductive imaging members with symmetrical dimeric perylenes, and in U.S. Pat. No. 5,683,842, the disclosure of which is totally incorporated herein by reference, photoconductive imaging members with unsymmetrical dimer perylenes. A number of the components of the imaging members of these applications, such as the substrates, resin binders, charge transports, and the like, can be selected for the imaging members of the present invention.

BACKGROUND OF THE INVENTION

The present invention is directed generally to photogenerating components, and more specifically, dimeric perylene photogenerating pigments, which are environmentally acceptable, and substantially nontoxic, and which perylenes are, for example, of the formula

FORMULA 1

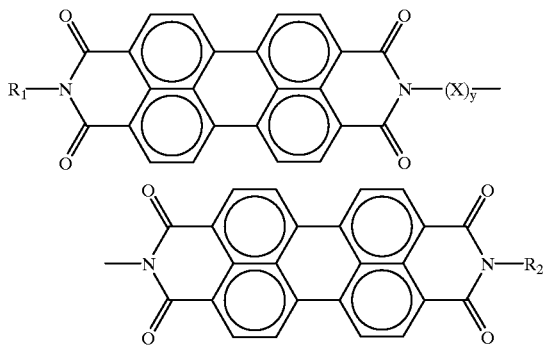

wherein $R_1$ and $R_2$ can be hydrogen, alkyl, cycloalkyl, substituted alkyl, aryl, substituted aryl, aralkyl, substituted aralkyl, and the like, and wherein each R is dissimilar, and more specifically, wherein, for example, one R can be alkyl, and the other R can be aryl, and X represents a symmetrical bridging moiety, such as a N-N single bond, that is y is zero, for example, the two imide nitrogens are directly attached, or alkylene, substituted alkylene, arylene, substituted arylene, aralkylene or substituted aralkylene, and the like, and y represents the number of X components, and is preferably zero or 1. The molecular weight, $M_w$, of the dimers of Formula 1 above are, for example, from about 778 to about 2,000, and preferably from about 778 to about 1,100.

The unsymmetrical perylene dimers illustrated herein can be selected as a photoactive component in photoconductive imaging members useful in electrophotographic printing; organic solar cells and, because of their asymmetry they are expected to possess nonlinear optical properties. Moreover, in embodiments the unsymmetrical dimers can be selected as a colorant in polymeric composite materials such as plastics, xerographic toners, and the like. The dimeric perylenes of Formula 1 can also be selected, it is believed, as a component for solid state devices such as solar cells, chemical sensors, electroluminescent devices and non-linear optical devices, and as dispersed colorants for coloration of, for example, plastics.

PRIOR ART

Generally, layered photoresponsive imaging members are described in a number of U.S. patents, such as U.S. Pat. No. 4,265,990, the disclosure of which is totally incorporated herein by reference, wherein there is illustrated an imaging member comprised of a photogenerating layer, and an aryl amine hole transport layer. Examples of photogenerating layer components include trigonal selenium, metal phthalocyanines, vanadyl phthalocyanines, and metal free phthalocyanines. Additionally, there is described in U.S. Pat. No. 3,121,006 a composite xerographic photoconductive member comprised of finely divided particles of a photoconductive inorganic compound dispersed in an electrically insulating organic resin binder. The binder materials disclosed in the '006 patent can comprise a material which is substantially incapable of transporting for any significant distance injected charge carriers generated by the photoconductive particles.

The selection of selected perylene pigments as photoconductive substances is also known. There is thus described in Hoechst European Patent Publication 0040402, DE3019326, filed May 21, 1980, the use of N,N'-disubstituted perylene-3,4,9,10-tetracarboxyldiimide pigments as photoconductive substances. Specifically, there is, for example, disclosed in this publication N,N'-bis(3-methoxypropyl)perylene-3,4,9,10-tetracarboxyldiimide dual layered negatively charged photoreceptors with improved spectral response in the wavelength region of 400 to 700 nanometers. A similar disclosure is presented in Ernst Gunther Schlosser, *Journal of Applied Photographic Engineering*, Vol. 4, No. 3, page 118 (1978). There are also disclosed in U.S. Pat. No. 3,871,882 photoconductive substances comprised of specific perylene-3,4,9,10-tetracarboxylic acid derivative dyestuffs. In accordance with the teachings of this patent, the photoconductive layer is preferably formed by vapor depositing the dyestuff in a vacuum. Also, there is specifically disclosed in this patent dual layer photoreceptors with perylene-3,4,9,10-tetracarboxylic acid diimide derivatives, which have spectral response in the wavelength region of from 400 to 600 nanometers. Further, in U.S. Pat. No. 4,555,463, the disclosure of which is totally incorporated herein by reference, there is illustrated a layered imaging member with a chloroindium phthalocyanine photogenerating layer. In U.S. Pat. No. 4,587,189, the disclosure of which is totally incorporated herein by reference, there is illustrated a layered imaging member with a nonhalogenated perylene pigment photogenerating component. Both of the aforementioned patents disclose an aryl amine component as a hole transport layer.

Moreover, there are disclosed in U.S. Pat. No. 4,419,427 electrographic recording media with a photosemiconductive double layer comprised of a first layer containing charge carrier perylene diimide dyes, and a second layer with one or more compounds which are charge transporting materials when exposed to light, reference the disclosure in column 2, beginning at line 20. The two general types of monomeric perylene pigment, illustrated as follows in Formula 4, are commonly referred to as perylene bis(imides), 4a, and bis(imidazo) perylenes, 4b.

FORMULA 4

Perylene Bisimide (4a) and Bisimidazo (4b) Pigments

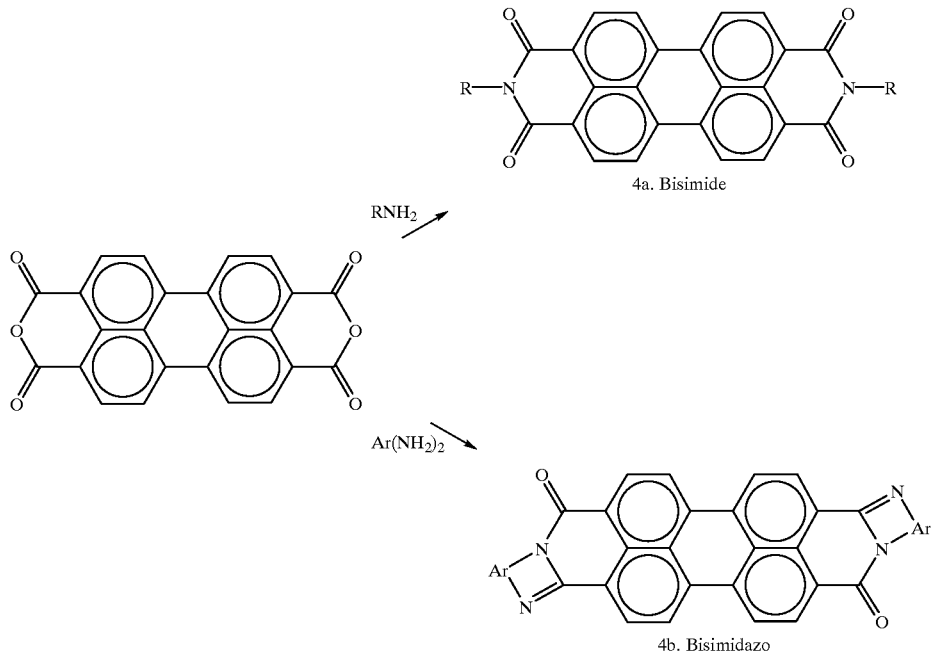

4a. Bisimide

4b. Bisimidazo wherein R=alkyl, aryl, aralkyl, etc.; Ar=1,2-phenylene, 1,8-naphthalenediyl, and the like.

These perylenes can be prepared by reacting perylene tetracarboxylic acid dianhydride with primary amines or with diamino-aryl or alkyl compounds. Their use as photoconductors is disclosed in U.S. Pat. Nos. 3,871,882, the disclosure of which is totally incorporated herein by reference, and 3,904,407. The '882 patent discloses the use of the perylene dianhydride and bisimides in general (Formula 4a, R=H, lower alkyl (C1 to C4), aryl, substituted aryl, aralkyl, a heterocyclic group or the NHR' group in which R' is phenyl, substituted phenyl or benzoyl) as vacuum evaporated thin charge generation layers (CGLs) in photoconductive devices coated with a charge transporting layer (CTL). The '407 patent, the disclosure of which is totally incorporated herein by reference, illustrates the use of bisimide compounds (Formula 3a, R=alkyl, aryl, alkylaryl, alkoxyl or halogen, or heterocyclic substituent) with preferred photogenerating pigments being R=chlorophenyl or methoxyphenyl. The disclosure of this patent illustrates the use of certain vacuum evaporated perylene pigments or a highly loaded dispersion of pigment in a binder resin as charge generating layer (CGL) in layered photoreceptors with a CTL overcoat or, alternatively, as a single layer device in which the perylene pigment is dispersed in a charge transporting active polymer matrix. The use of purple to violet dyestuffs with specified chromaticity values, including bisimidazo perylenes, specifically cis and trans bis(benzimidazo)perylene (Formula 4b, X=1,2-phenylene) and bis(1,8-naphthimidazo)perylene (Formula 4b, X=1,8-naphthalenediyl), is disclosed in U.S. Pat. No. 3,972,717. This patent also describes the use of vacuum-evaporated CGLs in layered photoconductive devices. The use of a plurality of pigments, inclusive of perylenes, in vacuum evaporated CGLs is illustrated in U.S. Pat. No. 3,992,205.

U.S. Pat. No. 4,419,427 discloses the use of highly-loaded dispersions of perylene bisimides, with bis(2,6-dichlorophenylimide) being a preferred material, in binder resins as CGL (charge generating layers) layers in devices overcoated with a charge transporting layer such as a poly (vinylcarbazole) composition. U.S. Pat. No. 4,429,029 illustrates the use, in devices similar to those of the '427 patent, of bisimides and bisimidazo perylenes in which the perylene nucleus is halogenated, preferably to an extent where 45 to 75 percent of the perylene ring hydrogens have been replaced by halogen. U.S. Pat. No. 4,587,189, the disclosure of which is totally incorporated herein by reference, illustrates layered photoresponsive imaging members prepared with highly-loaded dispersions or, preferably, vacuum evaporated thin coatings of cis- and trans-bis(benzimidazo) perylene (4a, X=1,2-phenylene) and other perylenes overcoated with hole transporting compositions comprised of a variety of N,N,N',N'-tetraaryl-4,4'-diaminobiphenyls. U.S. Pat. No. 4,937,164 illustrates the use of perylene bisimides and bisimidazo pigments in which the 1,12-and/or 6,7 position of the perylene nucleus is bridged by one or two sulfur atoms wherein the pigments in the CGL layers are either vacuum evaporated or dispersed in binder resins and a layer of tetraaryl biphenyl hole transporting molecules.

U.S. Pat. No. 4,517,270 illustrates bisimides with propyl, hydroxypropyl, methoxypropyl and phenethyl substituents (4a, R=$CH_3CH_2CH_2$—, $HOCH_2CH_2CH_2$—, $CH_3OCH_2CH_2CH_2$—, and $C_6H_5CH_2CH_2$—) which are black or dark primarily because of their crystal properties, and perylene pigments which are nuclearly substituted with anilino, phenylthio, or p-phenylazoanilino groups. Pigments of this type were indicated as providing good electrophotographic recording media with panchromatic absorption characteristics. Similarly, in U.S. Pat. No. 4,719,163 and U.S. Pat. No. 4,746,741 there are disclosed layered electrophotographic devices having certain spectral response to beyond 675 nanometers.

Two additional patents relating to the use of perylene pigments in layered photoreceptors are U.S. Pat. No. 5,019, 473, which illustrates a grinding process to provide finely and uniformly dispersed perylene pigment in a polymeric binder with excellent photographic speed, and U.S. Pat. No. 5,225,307, the disclosure of which is totally incorporated herein by reference, which discloses a vacuum sublimation process which provides a photoreceptor pigment, such as bis(benzimidazo)perylene (4b, X=1,2-phenylene) with superior electrophotographic performance.

The following patents relate to the use of perylene compounds as, for example, dissolved dyes or as dispersions in single layer electrophotographic photoreceptors usually based on sensitized poly(vinyl carbazole) compositions: U.S. Pat. Nos. 4,469,769; 4,514,482; 4,556,622; Japanese JP 84-31,957, -119,356, -119,357, -140,454, -140,456, -157, 646, and -157,651.

Dimeric perylene bisimide pigments are also known. For example, U.S. Pat. No. 4,968,571 discloses dimers of the type shown in Formula 1 wherein $R_1$ and $R_2$ are phenethyl groups and X is 1,4-phenylene. Dimeric, trimeric and tetrameric perylene bisimide pigments wherein the perylene imide nitrogens are attached to a carbocyclic or heterocyclic radical have been described in European Patent EP 0 711 812 A1 (Ciba-Geigy).

Also, U.S. Pat. No. 5,645,965, the disclosure of which is totally incorporated herein by reference, describes symmetrical perylene bisimide dimers of the type illustrated in Formula 1, wherein $R^1$ and $R^2$ are identical and U.S. Pat. No. 5,683,842, the disclosure of which is totally incorporated herein by reference, describes internally unsymmetrical bisimide dimers in which $R^1$ and $R^2$ are also identical but where X in Formula 1 is replaced by an unsymmetrical bridging group. The photogenerating components, such as pigments described in these Patents were shown to provide layered xerographic devices with overall excellent sensitivity and spectral response. A number of the components of the imaging members of these patents such as the substrates, resin binders, charge transports, and the like can be selected for the imaging members of the present invention.

While the above described layered perylene-based photoreceptors, or photoconductive imaging members may exhibit desirable xerographic electrical characteristics, the terminally unsymmetrical dimers of the present invention, particularly those in which the bridging group, X, is an alkylene like 1,3-propylene, exhibit, on the average, higher photosensitivities as indicated by the measured $E_{1/2}$ values. This measurement, which is used routinely in photoreceptor technology is defined as the energy required (in ergs/square centimeter) to discharge a photoreceptor from an initial surface charge to one half of this initial value, for example, from 800 to 400 volts surface potential. An $E_{1/2}$ value of about 10–12 erg/cm$^2$ would be classed as acceptable, 5–6 erg/cm$^2$ as good, and values below about 3 erg/cm$^2$ as excellent. As shown in Table 2, below, which illustrate the photosensitivities of layered devices prepared from 23 representative terminally unsymmetrical dimers, they possess excellent to superior sensitivities with $E_{1/2}$ values ranging from 2.7 to 5.5 ergs/cm$^2$ and only four examples with $E_{1/2}$ greater than 12 ergs/cm$^2$.

Although a number of known imaging members are suitable for their intended purposes, a need remains for imaging members containing improved substantially non-toxic photogenerator pigments. In addition, a need exists for imaging members containing photoconductive components with improved xerographic electrical performance including higher charge acceptance, lower dark decay, increased charge generation efficiency and charge injection into the transporting layer, tailored PIDC curve shapes to enable a variety of reprographic applications, reduced residual charge and/or reduced erase energy, improved long term cycling performance, and less variability in performance with environmental changes in temperature and relative humidity. There is also a need for imaging members with photoconductive components comprised of certain photogenerating pigments with enhanced dispersability in polymers and solvents. Moreover, there is a need for photogenerating pigments which permit the preparation of coating dispersions, particularly in dip-coating operations, which are colloidally stable and wherein settlement is avoided or minimized, for example little settling for a period of from 20 to 30 days in the absence of stirring. Further, there is a need for photoconductive materials with enhanced dispersability in polymers and solvents that enable low cost coating processes in the manufacture of photoconductive imaging members. Additionally, there is a need for photoconductive materials that enable imaging members with enhanced photosensitivity in the red region of the light spectrum, enabling the resulting imaging members thereof to be selected for imaging by red diode and gas lasers. Furthermore, there is a need for photogenerator pigments with spectral response in the green and blue regions of the spectrum to enable imaging by newly emerging blue and green electronic imaging light sources. A need also exists for improved panchromatic pigments with broad spectral response from about 400 to 700 nanometers for color copying using light-lens processes. There also is a need for photogenerating pigments which can be readily prepared from commercially available reactants, and for preparative processes and purification techniques which provide highly pure, for example 98 to 99.9 percent, photogenerating pigments with outstanding xerographic electrical performance, without recourse to expensive and time consuming post-synthetic purification methods such as solvent extraction or vacuum sublimation. These and other needs may be accomplished, it is believed, in embodiments of the present invention.

SUMMARY OF THE INVENTION

Examples of features of the present invention include:

It is an feature of the present invention to provide improved environmentally acceptable unsymmetrical perylene bisimide dimers wherein, for example, the terminal imide nitrogens are bonded to different R groups and imaging members thereof with many of the advantages illustrated herein.

It is another feature of the present invention to provide imaging members with novel photoconductive components with improved photoconductivity.

Additionally in another feature of the present invention there are provided (1) unsymmetrical perylene bisimide dimers suitable for use as dispersed colorants in polymeric composites and as photogenerator pigments in layered photoconductive imaging devices; (2) unsymmetrical perylene bisimide dimers comprised of two dissimilar perylene bisimide moieties joined together by a symmetrical bridging group or linked together by imide nitrogens; processes for the preparation of such dimeric pigments from readily available starting materials; and processes for the purification of these dimers which enable photoelectrically stable materials for their selection as photogenerator pigments in photoconductive imaging devices, or members.

It is another feature of the present invention to provide photoconductive imaging members with unsymmetrical perylene dimer photogenerating pigments with the formulas illustrated herein, and that enable imaging members with improved photosensitivity in the visible wavelength region of light spectrum, such as from about 400 to about 700 nanometers.

It is another feature of the present invention to provide unsymmetrical dimeric pigments which can possess a variety of colors such as magenta, red, brown, black, green, and the like; the color being primarily dependent on the types of terminal and bridging groups present.

Still, another feature of the present invention relates to the provision of novel compounds, and more specifically, compounds of the formulas illustrated herein.

Aspects of the present invention relate to a photoconductive imaging member comprised of an unsymmetrical perylene of the formula

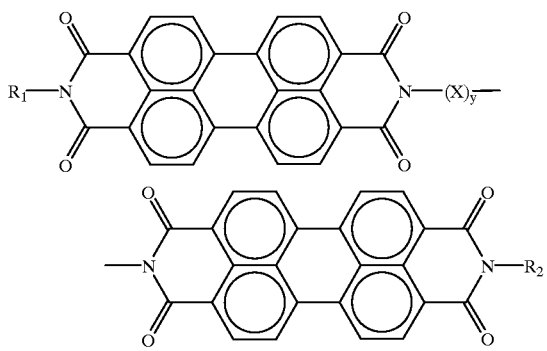

wherein each $R_1$ and $R_2$ are dissimilar and wherein the $R_1$ and $R_2$ are hydrogen, alkyl, cycloalkyl, substituted alkyl, aryl, substituted aryl, aralkyl, and substituted aralkyl, and X represents a symmetrical bridging component, and y represents the number of X components; a photococductive imaging member wherein X is alkylene, substituted alkylene, arylene, substituted arylene, aralkylene or substituted aralkylene; a photoconductive imaging member wherein y is a number of from 0 to about 6; a photoconductive imaging member wherein y is 0 or y is 1; a photoconductive imaging member wherein alkyl contains from 1 to about 25 carbon atoms, cycloalkyl contains from about 3 to about 30 carbon atoms, aryl contains from about 6 to about 30 carbon atoms, substituted alkyl contains from 1 to about 30 carbon atoms, substituted aryl contains from about 7 to about 37 carbon atoms, and substituted aralkyl contains from about 7 to about 37 carbon atoms; a photoconductive imaging member wherein y is 0 or 1, $R_1$ is alkyl, $R_2$ is aryl, and X is alkylene; a photoconductive imaging member wherein y is 0 or 1, $R_1$ is methyl, $R_2$ is ethyl, and X is alkylene; a photoconductive imaging member comprised of a supporting substrate, a charge transport layer, and a photogenerator layer comprised of a component as essentially represented by the formula

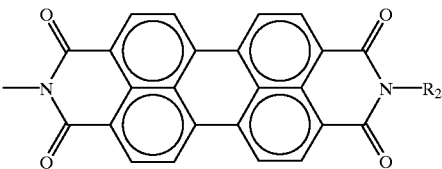

-continued

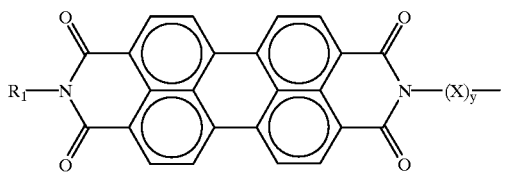

wherein each $R_1$ and $R_2$ are dissimilar and wherein the $R_1$ and $R_2$ are hydrogen, alkyl, cycloalkyl, substituted alkyl, aryl, substituted aryl, aralkyl, and substituted aralkyl, and X represents a symmetrical bridging component, and y represents the number of X components; an imaging member wherein $R_1$ is hydrogen or alkyl and $R_2$ is alkyl; an imaging member wherein alkyl contains from 1 to about 25 carbon atoms, aryl contains from 6 to about 24 carbon atoms, and aralkyl contains from 7 to about 30 carbon atoms; an imaging member wherein alkyl is methyl, ethyl, propyl, isopropyl, butyl, isobutyl, sec-butyl, 2-methylbutyl, 3-methylbutyl, n-pentyl, 2-pentyl, 3-pentyl, neopentyl, n-hexyl, n-heptyl, n-octyl, n-nonyl or n-decyl; cycloalkyl is cyclopropyl, cyclobutyl, cyclopentyl, cyclohexyl, cycloheptyl, cyclooctyl or cyclododecyl, and wherein substituted alkyl is 3-hydroxypropyl, 2-methoxyethyl, 3-methoxypropyl, 3-ethoxypropyl, 4-methoxybutyl, 2-carboxyethyl, 3-carboxybutyl or 3-dimethylaminopropyl; wherein substituted aryl is 2-, 3-, or 4-hydroxyphenyl, 2-, 3-, or 4-methylphenyl, 2-, 3-, or 4-tertiary-butylphenyl, 2-, 3-, or 4-methoxyphenyl, 2-, 3-, or 4-halophenyl, 2-, 3-, or 4-nitrophenyl, 2-, 3-, or 4-cyanophenyl or 2-, 3-, or 4-dimethylaminophenyl; wherein aralkyl is benzyl, phenethyl or 3-phenylpropyl; wherein substituted aralkyl is 2-, 3-, or 4-hydroxybenzyl, 2-, 3-, or 4-methylbenzyl, 2-, 3-, or 4-tertiary-butylbenzyl, 2-, 3-, or 4-methoxybenzyl, 2-, 3-, or 4-halobenzyl, 2-, 3-, or 4-nitrobenzyl, 2-, 3-, or 4-cyanophenyl, 2-, 3-, or 4-dimethylaminobenzyl, 2-, 3-, or 4-hydroxyphenethyl, 2-, 3-, or 4-methylphenethyl, 2-, 3-, or 4-tertiary-butylphenethyl, 2-, 3-, or 4-methoxyphenethyl, 2-, 3-, 4-halophenethyl, 2-, 3-, or 4-nitrophenethyl, 2-, 3-, or 4-cyanophenethyl or 2-, 3-, or 4-dimethylaminophenethyl, and wherein halo is chloro, fluoro, iodo, or bromo; an imaging member wherein X is an alkylene containing from 2 to about 20 carbon atoms or an arylene containing from 6 to about 24 carbon atoms; an imaging member wherein X is an alkylene of 1,2-propylene, butane-1,2-diyl, butane-1,3-diyl, pentane-1,3-diyl, pentane-1,4-diyl, 2-methylbutane-1,4-diyl, hexane-1,5-diyl, or 2-methylpentane-1,5-diyl; or wherein X is a substituted alkylene of 2-methoxybutane-1,4-diyl, 2-hydroxybutane-1,4-diyl or 2-dimethyl aminobutane-1,4-diyl; an imaging member wherein X is an arylene of biphenyl-2,3-diyl, biphenyl-2,4'-diyl, biphenyl-1,4-diyl, naphthalene-1,3-diyl, naphthalene-1,6-diyl or naphthalene-1,7-diyl; wherein X is an arylene of 2-fluoro-, 2-chloro-, 2-bromo-, 2-hydroxy-, 2-methyl-, 2-methoxy-, 2-dimethylamino-, 2-cyano-, or 2-nitro-phenyl; 2-fluoro-, 2-chloro-, 2-bromo-, 2-hydroxy-, 2-methyl-, 2-methoxy-, 2-dimethylamino-, 2-cyano-, or 2-nitro-biphenyl; 3-fluoro-, 3-chloro-, 3-bromo-, 3-hydroxy-, 3-methyl-, 3-methoxy-, 3-dimethylamino-, 3-cyano-, or wherein X is 3-nitrobiphenyl, diphenyl ether-3,4'-diyl, diphenylsulfone-3,4'- diyl; or benzanilide-4,4'-diyl; an imaging member wherein aralkylene is toluene-a,3-diyl, toluene-a,4-diyl, ethylbenzene-b,4-diyl, propylbenzene-g,4-diyl, fluorene-2,9-diyl or fluorene-3,9-diyl; an imaging member wherein X is a substituted aralkylene of 2-fluoro-, 2-chloro-, 2-bromo-, 2-hydroxy-, 2-methyl-, 2-methoxy-, 2-dimethylamino-, 2-cyano- or 2-nitro-toluene-a,4-diyl; 2-fluoro-, 2-chloro-, 2-bromo-, 2-hydroxy-, 2-methyl-, 2-methoxy-, 2-dimethylamino-, 2-cyano- or 2-nitro-ethylbenzene-b,4-diyl; or 3-fluoro-, 3-chloro-, 3-bromo-, 3-hydroxy-, 3-methyl-, 3-methoxy-, 3-dimethylamino-, 3-cyano- or 3-nitro-ethylbenzene-b,4-diyl; an imaging member wherein y is 1 and X is 1,2-propylene, butane-1,2-diyl, butane-1,3-diyl, pentane-1,3-diyl, pentane-1,4-diyl, 2-methylbutane-1,4-diyl, hexane-1,5-diyl, or 2-methylpentane-1,5-diyl; an imaging member wherein $R_1$ and $R_2$ are methyl, ethyl, n-propyl, 3-methoxypropyl, n-butyl, isobutyl, n-pentyl, 2-pentyl, 3-pentyl, 2-methylbutyl, 3-methylbutyl, neopentyl, n-hexyl, n-heptyl, n-octyl, benzyl, 3-chlorobenzyl or phenethyl, subject to the provision that each $R_1$ and $R_2$ are dissimilar; an imaging member wherein $R_1$ and $R_2$ are dissimilar and each $R_1$ and $R_2$ is methyl, ethyl, n-propyl, 3-methoxypropyl, n-butyl, isobutyl, n-pentyl, 2-pentyl, 3-pentyl, 2-methylbutyl, 3-methylbutyl, neopentyl, n-hexyl, n-heptyl, n-octyl, benzyl, 3-chlorobenzyl or phenethyl, and X-Y is 1,2-propylene, butane-1,2-diyl, butane-1,3-diyl, pentane-1,3-diyl, pentane-1,4-diyl, 2-methylbutane-1,4-diyl, hexane-1,5-diyl, or 2-methylpentane-1,5-diyl; an imaging member wherein $R_1$ and $R_2$ are dissimilar and each $R_1$ and $R_2$ is hydrogen, methyl, ethyl, n-propyl, 3-methoxypropyl, n-butyl, isobutyl, n-pentyl, 2-pentyl, 3-pentyl, 2-methylbutyl, 3-methylbutyl, neopentyl, n-hexyl, n-heptyl, n-octyl, benzyl, 3-chlorobenzyl or phenethyl, and X-Y is toluene-a,4-diyl, or X-Y is ethylbenzene-b,4-diyl; or wherein $R_1$ and $R_2$ are hydrogen, methyl, ethyl, n-propyl, 3-methoxypropyl, n-butyl, isobutyl, n-pentyl, 2-pentyl, 3-pentyl, 2-methylbutyl, 3-methylbutyl, neopentyl, n-hexyl, n-heptyl, n-octyl, benzyl, 3-chlorobenzyl or phenethyl, and X-Y is diphenyl ether-3,4'-diyl; or wherein $R_1$ and $R_2$ are hydrogen, methyl, ethyl, n-propyl, 3-methoxypropyl, n-butyl, isobutyl, n-pentyl, 2-pentyl, 3-pentyl, 2-methylbutyl, 3-methylbutyl, neopentyl, n-hexyl, n-heptyl, n-octyl, benzyl, 3-chlorobenzyl or phenethyl, X is benzanilide-4,4'-diyl, and y is zero; an imaging member wherein $R_1$ is n-pentyl, $R_2$ is methyl, and X is 2-methylpentane-1,5-diyl; an imaging member wherein the supporting substrate is a metal, a conductive polymer, or an insulating polymer, each with a thickness of from about 30 microns to 300 microns optionally overcoated with an electrically conductive layer with an optional thickness of from about 0.01 micron to about 1 micron; an imaging member wherein there is further included an overcoating polymer top layer on the member; an imaging member wherein the photogenerator layer component is dispersed in a resinous binder in an amount of from about 5 percent to about 95 percent by weight; an imaging member wherein the resinous binder is a polyester, a polyvinylcarbazole, a polyvinylbutyral, a polycarbonate, a polyethercarbonate, an aryl amine polymer, a styrene copolymer, or a phenoxy resin; an imaging member wherein the charge transport layer is comprised of aryl amines or aryl amine polymers; an imaging member wherein said charge transport layer is comprised of an amine; an imaging member wherein said charge transport layer is comprised of molecules of the formula

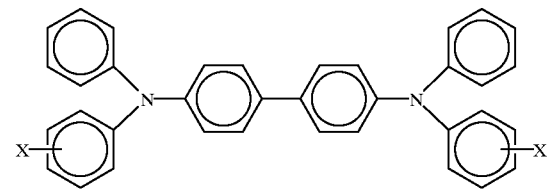

wherein X is independently halo or alkyl; an imaging member wherein the charge transport layer is comprised of said aryl amine molecules dispersed in a highly insulating polymer in an amount of from about 20 to about 60 percent; an imaging member wherein the highly insulating polymer is a polycarbonate, a polyester, or a vinyl polymer; an imaging member wherein the photogenerating layer is of a thickness of from about 0.2 to about 10 microns, wherein the charge transport layer is of a thickness of from about 10 to about 100 microns, and wherein the supporting substrate is overcoated with a polymeric adhesive layer of a thickness of from about 0.01 to about 1 micron; an imaging member wherein $R_1$ is hydrogen, methyl, ethyl, n-propyl, 3-methoxypropyl, n-butyl, isobutyl, n-pentyl, 2-pentyl, 3-pentyl, 2-methylbutyl, 3-methylbutyl, neopentyl, n-hexyl, n-heptyl, n-octyl, benzyl, 3-chlorobenzyl or phenethyl, and X is toluene-a,4-diyl, ethylbenzene-b,4-diyl, diphenyl ether-3,4'-diyl, or benzanilide-4,4'-diyl; an imaging member wherein y is 0, or wherein y is 1; an imaging method comprising the formation of a latent image on the photoconductive imaging member, developing the image with a toner composition comprised of resin and colorant, transferring the image to a substrate, and optionally fixing the image thereto; unsymmetrical perylene dimers

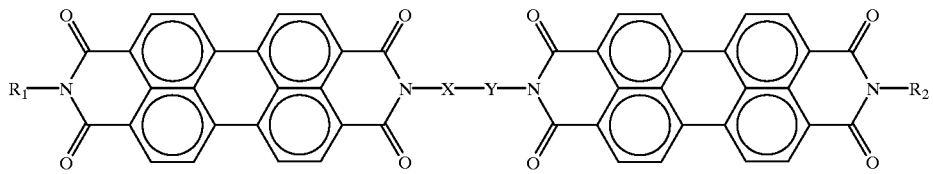

wherein each $R_1$ and $R_2$ are dissimilar and wherein the $R_1$ and $R_2$ are hydrogen, alkyl, cycloalkyl, substituted alkyl, aryl, substituted aryl, aralkyl, and substituted aralkyl, and X represents a symmetrical bridging component; a perylene wherein alkyl contains from 1 to about 25 carbon atoms, aryl contains from 6 to about 24 carbon atoms, and aralkyl contains from 7 to about 30 carbon atoms; a perylene wherein $R_1$ is hydrogen, and alkyl is methyl, ethyl, propyl, butyl, isobutyl, sec-butyl, 2-methylbutyl, 3-methylbutyl, n-pentyl, 2-pentyl, 3-pentyl, neopentyl, n-hexyl, n-heptyl n-octyl, n-nonyl or n-decyl, and $R_2$ is alkyl, or wherein $R_1$ is hydrogen, methyl, ethyl, n-propyl, 3-methoxypropyl, n-butyl, isobutyl, n-pentyl, 2-pentyl, 3-pentyl, 2-methylbutyl, 3-methylbutyl, neopentyl, n-hexyl, n-heptyl, n-octyl, benzyl, 3-chlorobenzyl or phenethyl, and $R_2$ is alkyl, and wherein X is 1,2-propylene, butane-1,2-diyl, butane-1,3-diyl, pentane-1,3-diyl, pentane-1,4-diyl, 2-methylbutane-1,4-diyl, hexane-1,5-diyl, or 2-methylpentane-1,5-diyl; a photoconductive imaging member comprised of a photogenerator layer comprised of a component as essentially represented by the formula

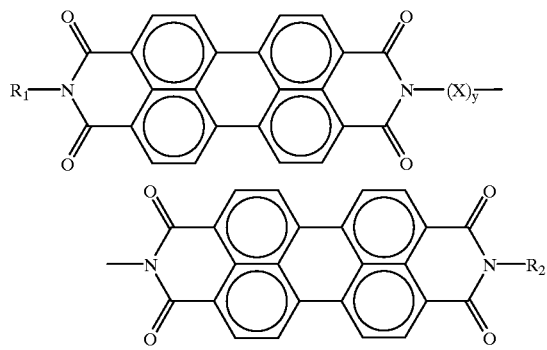

wherein each $R_1$ and $R_2$ are dissimilar and X represents a symmetrical bridging component, and y represents the number of X components; a photoconductive imaging member further including a supporting substrate and a charge transport layer; and layered imaging members comprised of a supporting substrate, a photogenerating layer comprised of photogenerating pigments comprised of unsymmetrical perylene bisimide dimers, such as those of Formula 1, and more specifically, wherein each R is dissimilar and is, for example, hydrogen, alkyl, such as methyl, ethyl, n-propyl, n-butyl, isobutyl, n-pentyl, 2-methylbutyl, 3-methylbutyl, n-hexyl, phenyl, benzyl, phenethyl and the like, and X is a symmetrical bridging group such as a bond between the two imide nitrogens, or alkylene, arylene, aralkylene, and the like.

Alkyl includes linear and branched components with, for example, from 1 to about 25, and preferably from 1 to about 10 carbon atoms, such as methyl, ethyl, propyl, butyl, pentyl, 2-methylbutyl, heptyl, octyl, decyl, and the like. Cycloalkyl includes homologous rings of, for example, cyclopropane to cyclododecane. Substituted alkyl groups contain substituents such as hydroxy, alkoxy, carboxy, cyano, dialkylamino and the like. Aryl includes components with, for example, from 6 to about 30 carbon atoms such as phenyl, naphthyl, biphenyl, terphenyl and the like. Substituted aryl groups contain, for example, one to five substituents such as alkyl like methyl, or tertiary-butyl, halogen (fluoro, chloro, bromo, and iodo), hydroxy, alkoxy like methoxy, nitro, cyano and dimethylamino. Aralkyl includes components with from 7 to about 24 carbon atoms such as benzyl, phenethyl, fluorenyl and the like. Substituted aralkyl groups can contain the same substituents as the aforementioned aryl groups, and more specifically, for example, methyl, tertiary-butyl, halogen, hydroxy, methoxy, nitro and dialkylamino.

The symmetrical bridging group, X, can be a nitrogen-nitrogen single bond (i.e. wherein the two perylene imide nitrogens are directly joined), that is y is zero, alkylene such as ethylene, 1,3-propylene. 2-methyl-1,3-propylene, 2,2-dimethyl-1,3-propylene, 1,4-tetramethylene(1,4-butanediyl), 1,2-butanediyl, 1,5-pentamethylene and higher symmetric alkylene groups with up to about 20 carbon atoms. Symmetric substituted alkylenes include, for example, 2-methoxy-1,3-propylene. Arylene refers, for example, to symmetrically substituted bridging groups including 1,4-phenylene, 4,4'-biphenylene and the like. Symmetric aralkylene includes groups such as, for example, ortho-, meta-, and para-α,α-xylenediyl or p,p'-diphenylmethanediyl, and the like.

Symmetrical alkylenes include ethylene, 1,3-propylene, 1,2-methyl-1,3-propylene, 3-methyl-1,5-pentamethylene and higher and higher symmetric alkylene groups with up to about 20 carbon atoms. Unsymmetric substituted alkylenes include, for example, 2-hydroxy-1,3-propylene, 2-methoxy-1,3-propylene, and 3-dimethylamino-1,5-pentamethylene. Arylene refers, for example, to symmetrically substituted bridging groups such as 1,2-, 1,3-, and 1,4-phenylene, 1,4-, 1,5-, 1,8-, 2,3-, 2,6- and 2,7-naphthalenediyl, and 3,3'- and 4.4'-biphenylene. Substituted arylenes refers, for example, to groups such as 2,2'-dimethyl-4,4'-biphenylene, diphenylsulfone-4,4'-diyl and diphenylether-4,4'-diyl. Aralkylene includes symmetrical bridging groups such as the ortho-, meta-, and para isomers of α,α'-xylenediyl or 2,7-fluorenediyl. Substituted symmetrical aralkylene refers, for example, to groups of the aforementioned class in which substituents such as methyl, tertiary-butyl, halogen of, for example, fluoro, chloro, bromo, and iodo, hydroxy, methoxy, nitro, cyano and dimethylamino are attached to the aromatic ring such as, for example, 3-chloro-α,α'-xylenediyl.

Embodiments of the present invention include a process for the preparation of substantially toxic free unsymmetrical perylene bisimide dimers in high yield and high purity, which process comprises the reaction of a perylene monoimido anhydride of the following Formula 2, with a mono aminoalkyl or aminoaryl perylene bisimide of the type illustrated in Formula 3, in a high boiling solvent, such as N-methylpyrrolidine, followed by filtration and washing the resultant product with hot solvents to remove residual starting components and other byproducts.

FORMULA 2

Monoimidoperylene Monoanhydride

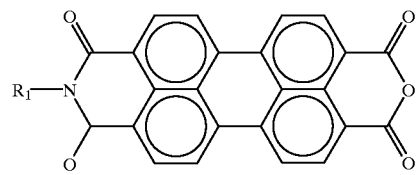

wherein $R_1$ represents the groups or substituents described in Formula 1.

FORMULA 3

Monoaminoalkyl or Monoaminoaryl Perylene Bisimide

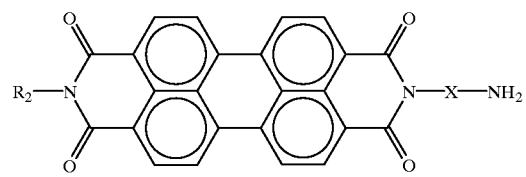

wherein $R_2$ and X represent the groups indicated herein with reference to Formula 1.

Compounds of the type shown in Formula 2 have been described, for example, in U.S. Pat. No. 4,709,029, the disclosure of which is totally incorporated herein by reference, and more recently, by Y. Nagao and coworkers in "Dyes and Pigments", Volume 32, pp. 71–83 (1996), the disclosure of which is totally incorporated herein by reference.

Important embodiments of the present invention include photoconductive imaging members comprised of a supporting substrate, a photogenerating layer comprised of the perylene dimer pigments illustrated herein of Formula 1 and a charge transport layer; photogenerating pigments comprised of terminally-unsymmetrical perylene bisimide dimers, and imaging member comprised of a supporting substrate, a photogenerating layer, preferably situated between the supporting substrate and a charge transport layer, and comprised of an unsymmetrical perylene dimer of Formula 1 and, more specifically, wherein where $R_1$ and $R_2$ are selected from hydrogen, methyl, ethyl, n-propyl, 3-methoxypropyl, n-butyl, isobutyl, sec-butyl, n-pentyl, 2-methylbutyl, 3-methylbutyl, n-hexyl, n-heptyl, n-octyl, benzyl, 3-chlorobenzyl, phenethyl and X=ethylene, 1,3-propylene, 1,4-tetramethylene, 1,6-hexamethylene, 4,4'-phenylene and the like, and a charge, especially hole, transport layer. More specifically, the unsymmetrical perylene dimers of the present invention are comprised of two different perylene bisimide molecules with a different terminal substituent ($R_1$ and $R_2$ groups in Formula 1). The perylenes of the present invention can be characterized as having no center of symmetry. Imaging members with the photogenerating pigments of the present invention are sensitive to wavelengths of from about 425 to about 700 nanometers, that is in the visible region of the light spectrum. In embodiments thereof, the imaging members of the present invention generally possess broad spectral response to white light or, specifically to red, green and blue light emitting diodes and stable electrical properties over long cycling times. Many of the unsymmetrical perylene bisimide dimers of the present invention when selected as photogenerator pigments exhibit excellent charge acceptance of about 800 volts surface potential in a layered device, dark decay of less than about 50 volts per second, for example about 5 to about 45, photosensitivities ranging from $E_{1/2}$ of less than about 3, for example about 2.5 to about 20 ergs, excellent dispersibility and low solubility in typical coating compositions, such as solutions of certain polymers in organic solvents, such as methylene chloride, toluene, cyclohexanone, tetrahydrofuran, chlorobenzene and butyl acetate, selected for the preparation of layered photoresponsive, or photoconductive imaging members. The perylenes of the present invention can be selected as a substitute for selenium, such as trigonal selenium, in layered photoconductive imaging members, and further the imaging members of the present invention can be selected with red blue and green LED lasers, for digital systems, and for upgraded visible light systems and machines. Furthermore, the perylene dimer pigments are highly colored and can be prepared with a variety of hues, such as orange, red, magenta, maroon, brown, black, greenish black, and the like, depending, for example, on the $R_1$, $R_2$ and X substituents.

With the present invention in embodiments, photoconductive imaging members with the terminally unsymmetrical perylene dimer pigments obtained by coupling two dissimilar perylene monomers together via a symmetrical bridging group (X) in Formula 1 enable a number of advantages compared, for example, to photoconductive imaging members with monomeric perylene pigments or with symmetrical dimeric perylene pigments described in U.S. Pat. No. 5,645,842, and internally unsymmetrical dimers described in U.S. Pat. No. 5,683,965. For example, as indicated hereinafter, the dimer of Formula 1 wherein X=1,3-propylene, $R_1$ is n-butyl and $R_2$ is n-hexyl possesses a photosensitivity $E_{1/2}$ of 2.7 ergs/cm$^2$ which is significantly higher than either of the corresponding two symmetrical dimers wherein X=1,3-propylene and $R_1$=$R_2$=n-butyl, or X=1,3-propylene and $R_1$=$R_2$=n-hexyl which shows sensitivities of, respectively, $E_{1/2}$=4.69 and 4.34 ergs/cm$^2$.

The imaging members of the present invention are comprised, for example, of, preferably in the order indicated, a conductive substrate, a photogenerating layer comprising unsymmetrical perylene bisimide dimer pigments of Formula 1 dispersed in a resinous binder composition, and a charge transport layer, which comprises charge transporting molecules dispersed in an inactive resinous binder composition; or the photoconductive imaging members may comprise a substrate, a hole transport layer comprising a hole transport composition, such as an aryl amine, dispersed in an inactive resinous binder composition, and as a top layer a photogenerating layer comprised of unsymmetrical perylene bisimide dimer pigments optionally dispersed in a resinous binder composition; or a member comprised of a conductive substrate, a hole blocking metal oxide layer, an optional adhesive layer, a photogenerating layer comprised of the unsymmetrical perylene bisimide dimer component of the present invention, optionally dispersed in a resinous binder composition, and an aryl amine hole transport layer comprising aryl amine hole transport molecules optionally dispersed in a resinous binder.

Specific examples of unsymmetrical perylenes of the present invention illustrated include those wherein R, $R_1$ and $R_2$ are dissimilar, or different, and wherein R, $R_1$ and $R_2$ are hydrogen, methyl, ethyl, n-propyl, isopropyl, 3-methoxypropyl, 3-hydroxypropyl, cyclopropyl, cyclopropylmethyl, n-butyl, isobutyl, secbutyl, cyclobutyl, n-pentyl, 2-pentyl, 3-pentyl, 2-(3-methyl)butyl, 2-methylbutyl, 3-methylbutyl, neopentyl, cyclopentyl, n-hexyl, 2-ethylhexyl, cyclohexyl, n-heptyl, cycloheptyl, n-octyl, cyclooctyl, n-nonyl, n-decyl, n-undecyl, n-dodecyl, cyclododecyl, phenyl, benzyl, phenethyl and substituted phenyl, benzyl and phenethyl radicals in which the aromatic ring contains from 1 to 5 substituents inclusive of fluorine, chlorine, bromine, iodine, halide, methyl, hydroxymethyl, trifluoromethyl, ethyl, tertiary-butyl, tertiary-butoxy, methoxy, trifluoromethoxy, nitro, cyano, dimethylamino, diethylamino, and the like, and wherein X represents a bond between two imide nitrogens, that is y is zero, or a symmetrical bridging group inclusive of, but not limited to, the following specific examples.

Illustrative Examples of Symmetrical Bridging Groups (X in Formula 1)

X=Symmetrical Substituted Arylene

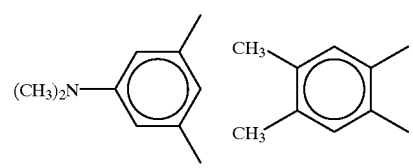

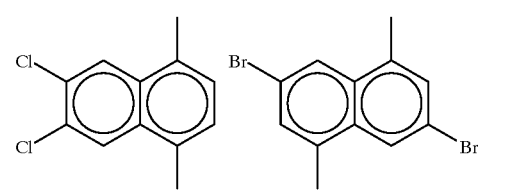

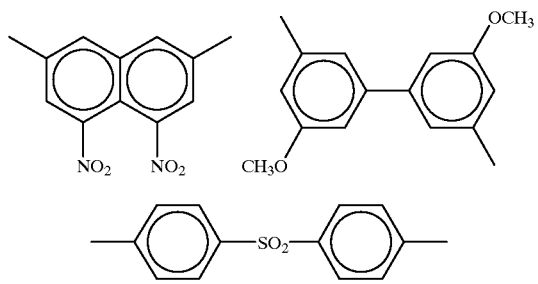

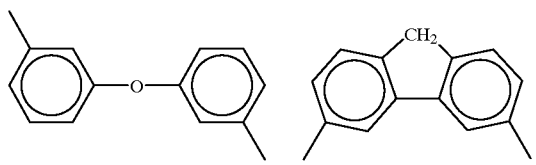

X=Symmetrical Aralkylene

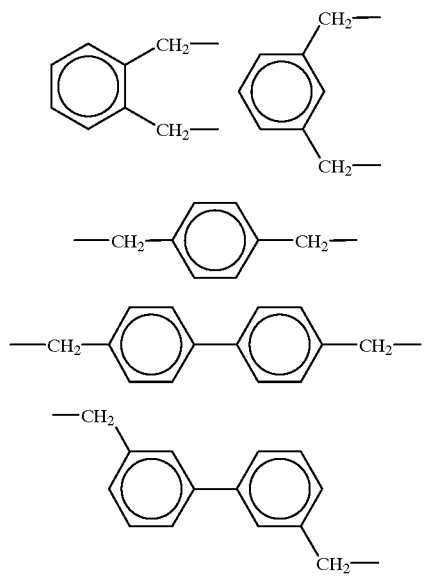

X=Symmetrical Substituted Aralkylene

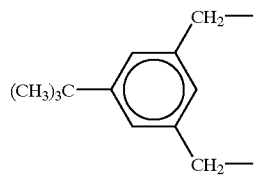

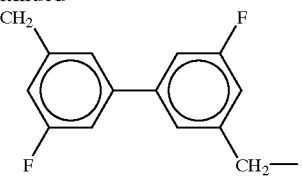

X=Symmetrical Alkylene

—CH$_2$CH$_2$— —CH$_2$CH$_2$CH$_2$— —CH$_2$CH(CH$_3$)CH$_2$—
—CH$_2$C(CH$_3$)$_2$CH$_2$— —CH$_2$CH$_2$CH$_2$CH$_2$— —CH$_2$CH
(CH$_3$)CH(CH$_3$)CH$_2$— —CH$_2$CH$_2$CH$_2$CH$_2$CH$_2$—
—CH$_2$CH$_2$CH(CH$_3$)CH$_2$CH$_2$—
—CH$_2$CH$_2$CH$_2$CH$_2$CH$_2$CH$_2$—
—CH$_2$CH$_2$CH$_2$CH$_2$CH$_2$CH$_2$CH$_2$—

X=Symmetrical Substituted Alkylene

—CH$_2$CH(OH)CH$_2$— —CH$_2$CH(OCH$_3$)CH$_2$—
—CH$_2$CH$_2$CH[N(CH$_3$)$_2$]CH$_2$CH$_2$—

X=Symmetrical Arylene

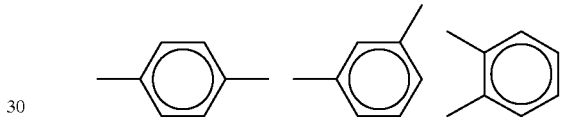

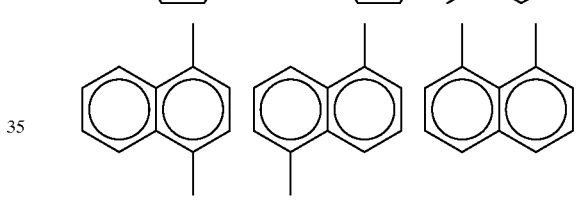

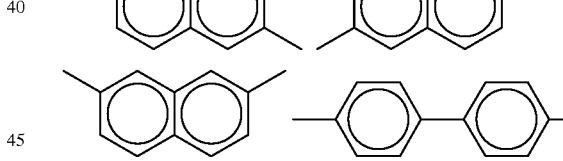

Specific examples of photogenerating unsymmetric perylene bisimide dimers of the present invention include those encompassed by Formula 1 wherein $R_1$ or $R_2$ is hydrogen, methyl, ethyl, n-propyl, allyl, 3-methoxypropyl, n-butyl, isobutyl, n-pentyl, 2-methylbutyl, 3-methylbutyl, neopentyl, n-hexyl, n-heptyl, n-octyl, phenyl, benzyl, 3-chlorobenzyl and phenethyl, and y is zero or 1, X is ethylene, 1,3-propylene, 2-methyl-1,3-propylene, and the like. More specifically, examples of the perylenes of the present invention are of the formulas:

Illustrative Example of Formula 1 wherein $R_1$=n-propyl, $R_2$=benzyl and X=N-N single bond

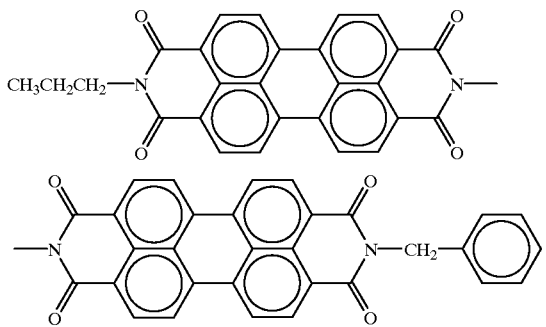

Illustrative Example of Formula 1 wherein $R_1$=n-butyl, $R_2$=isobutyl and X=1,3-propylene

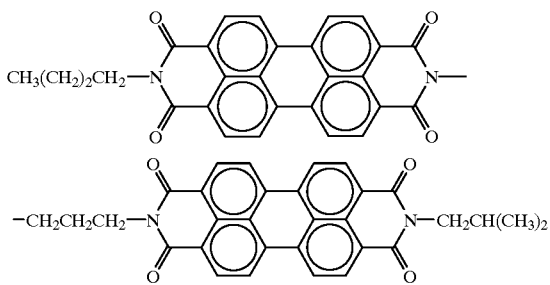

Illustrative Example of Formula 1 wherein $R_1$=methyl, $R_2$=phenyl and X=$\alpha,\alpha'$-meta-xylenediyl

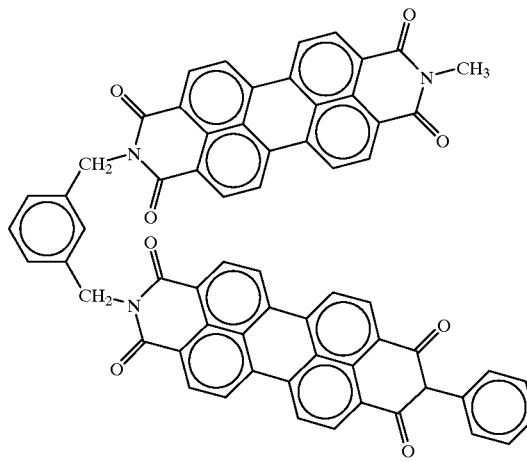

The substrate can be comprised of any suitable component, for example it can be formulated entirely of an electrically conductive material, or it can be comprised of an insulating material having an electrically conductive surface. The substrate can be of an effective thickness, generally up to about 100 mils, and preferably from about 1 to about 50 mils, although the thickness can be outside of this range. The thickness of the substrate layer depends on many factors, including economic and mechanical considerations. Thus, this layer may be of substantial thickness, for example over 100 mils, or of minimal thickness provided that there are no adverse effects thereof. In a particularly preferred embodiment, the thickness of this layer is from about 3 mils to about 10 mils. The substrate can be opaque or substantially transparent and can comprise numerous suitable materials having the desired mechanical properties. The entire substrate can comprise the same material as that in the electrically conductive surface, or the electrically conductive surface can merely be a coating on the substrate. Any suitable electrically conductive material can be employed. Typical electrically conductive materials include copper, brass, nickel, zinc, chromium, stainless steel, conductive plastics and rubbers, aluminum, semitransparent aluminum, steel, cadmium, titanium, silver, gold, paper rendered conductive by the inclusion of a suitable material therein or through conditioning in a humid atmosphere to ensure the presence of sufficient water content to render the material conductive, indium, tin, metal oxides, including tin oxide and indium tin oxide, and the like. The substrate layer can vary in thickness over substantially wide ranges depending on the desired use of the electrophotoconductive member. Generally, the conductive layer ranges in thickness of from about 50 Angstroms to about 100 centimeters, although the thickness can be outside of this range. When a flexible electrophotographic imaging member is desired, the thickness typically is, for example, from about 100 Angstroms to about 750 Angstroms. The substrate can be of any other conventional material, including organic and inorganic materials, such as insulating nonconducting materials such as various resins known for this purpose including polycarbonates, polyamides, polyurethanes, paper, glass, plastic, polyesters, such as MYLAR® (available from E.I. DuPont) or MELINEX 447® (available from ICI Americas, Inc.), and the like. If desired, a conductive substrate can be coated onto an insulating material. In addition, the substrate can comprise a metallized plastic, such as titanized or aluminized MYLAR®, wherein the metallized surface is in contact with the photogenerating layer or any other layer situated between the substrate and the photogenerating layer. The coated or uncoated substrate can be flexible or rigid, and can have any number of configurations, such as a plate, a cylindrical drum, a scroll, an endless flexible belt, or the like. The outer surface of the substrate preferably comprises a metal oxide such as aluminum oxide, nickel oxide, titanium oxide, and the like.

An optional intermediate adhesive layer may be situated between the substrate and subsequently applied layers to, for example, improve adhesion. When such adhesive layers are utilized, they preferably have a dry thickness of, for example, from about 0.1 micron to about 5 microns, although the thickness can be outside of this range. Typical adhesive layers include film-forming polymers such as polyester, polyvinylbutyral, polyvinylpyrrolidone, polycarbonate, polyurethane, polymethylmethacrylate, and the like as well as mixtures thereof. Since the surface of the substrate can be a metal oxide layer or an adhesive layer, the expression substrate is intended to also include a metal oxide layer with or without an adhesive layer on a metal oxide layer. Moreover, other known layers may be selected for the photoconductive imaging members of the present invention, such as polymer protective overcoats, and the like.

The photogenerating layer is of an effective thickness, for example, of from about 0.05 micron to about 10 microns or more, and in embodiments has a thickness of from about 0.1 micron to about 3 microns. The thickness of this layer can be dependent primarily upon the concentration of photogenerating material in the layer, which may generally vary from about 5 to 100 percent. The 100 percent value generally occurs when the photogenerating layer is prepared by vacuum evaporation of the pigment. When the photogenerating material is present in a binder material, the binder contains, for example, from about 25 to about 95 percent by weight of the photogenerating material, and preferably contains about 60 to 80 percent by weight of the photogenerating material. Generally, it is desirable to provide this layer in a thickness sufficient to absorb about 90 to about 95 percent or more of the incident radiation which is directed upon it in the imagewise or printing exposure step. The maximum thickness of this layer is dependent primarily upon factors, such as mechanical considerations, such as the specific photogenerating compound selected, the thicknesses of the other layers, and whether a flexible photoconductive imaging member is desired.

Typical transport layers are described, for example, in U.S. Pat. No. 4,265,990; 4,609,605; 4,297,424 and 4,921,773, the disclosures of each of these patents being totally incorporated herein by reference. Organic charge transport materials can also be employed.

Hole transport molecules of the type described in U.S. Pat. Nos. 4,306,008; 4,304,829; 4,233,384; 4,115,116; 4,299,897; 4,081,274, and 5,139,910, the disclosures of each are totally incorporated herein by reference, can be selected for the imaging members of the present invention. Typical diamine hole transport molecules include N,N'-diphenyl-N, N'-bis(3-methylphenyl)-(1,1 '-biphenyl)-4,4'-diamine, N, N'-diphenyl-N, N'-bis(4-methylphenyl)-(1,1 '-biphenyl)-4, 4'-diamine, N, N'-diphenyl-N, N'-bis(2 -methylphenyl)-(1, 1'-biphenyl)-4,4'-diamine, N, N'-diphenyl-N, N'-bis(3-ethylphenyl)-(1,1'-biphenyl)-4,4'-diamine, N, N'-diphenyl-N, N'-bis(4-ethylphenyl)-(1,1'-biphenyl)-4,4'-diamine, N, N'-diphenyl-N, N'-bis(4-n-butylphenyl)-(1,1'-biphenyl)-4, 4'-diamine, N,N'-diphenyl-N,N'-bis(3-chlorophenyl)-(1,1'-biphenyl)-4,4'-diamine, N, N'-diphenyl-N, N'-bis(4-chlorophenyl)-(1,1'-biphenyl)-4,4'-diamine, N,N'-diphenyl-N,N'-bis(phenylmethyl)-( 1,1'-biphenyl)-4,4'-diamine, N, N, N', N'-tetraphenyl-[2,2'-dimethyl-1,1'-biphenyl]-4,4'-diamine, N, N, N', N'-tetra-(4-methylphenyl)-[2,2'-dimethyl-1,1'-biphenyl]-4,4'-diamine, N,N'-diphenyl-N,N'-bis(4-methylphenyl)-[2,2'-dimethyl-1,1'-biphenyl]-4,4'-diamine, N, N'-diphenyl-N, N'-bis(2-methyl phenyl)-[2,2'-dimethyl-1,1 '-biphenyl]-4,4'-diamine, N, N'-diphenyl-N,N'-bis(3-methylphenyl)-[2,2'-dimethyl-l, 1'-biphenyl]-4,4'-diamine, N, N'-diphenyl-N,N'-bis(3-methylphenyl)-pyrenyl-1,6-diamine, and the like.

In embodiments of the present invention, the preferred hole transport layer, since it enables excellent effective transport of charges, is comprised of aryldiamine components as represented, or essentially represented, by the general formula of, for example, the U.S. patents indicated herein, such as 4,265,990, wherein X, Y and Z are selected from the group consisting of hydrogen, an alkyl group with, for example, from 1 to about 25 carbon atoms and a halogen, preferably chlorine, and at least one of X, Y and Z is independently an alkyl group or chlorine. When Y and Z are hydrogen, the compound may be N,N'-diphenyl-N,N'-bis(alkylphenyl)-(1,1'-biphenyl)-4,4'-diamine wherein alkyl is, for example, methyl, ethyl, propyl, n-butyl, or the like, or the compound may be N,N'-diphenyl-N,N'-bis(chlorophenyl)-(1,1'-biphenyl)-4,4'-diamine.

The charge transport component is present in the charge transport layer in an effective amount, generally from about 5 to about 90 percent by weight, preferably from about 20 to about 75 percent by weight, and more preferably from about 30 to about 60 percent by weight, although the amount can be outside of this range.

Examples of the highly insulating and transparent resinous components or inactive binder resinous material for the transport layer include binders such as those described in U.S. Pat. No. 3,121,006, the disclosure of which is totally incorporated herein by reference. Specific examples of suitable organic resinous materials include polycarbonates, acrylate polymers, vinyl polymers, cellulose polymers, polyesters, polysiloxanes, polyamides, polyurethanes, polystyrenes, and epoxies as well as block, random or alternating copolymers thereof. Preferred electrically inactive binder materials are polycarbonate resins having a molecular weight of from about 20,000 to about 100,000 with a molecular weight in the range of from about 50,000 to about 100,000 being particularly preferred. Generally, the resinous binder contains from about 5 to about 90 percent by weight of the active material corresponding to the foregoing formula, and preferably from about 20 percent to about 75 percent of this material.

Similar binder materials may be selected for the photogenerating layer, including polyesters, polyvinyl butyrals, polyvinylcarbazole, polycarbonates, polyvinyl formals, poly (vinylacetals) and those illustrated in U.S. Pat. No. 3,121,006, the disclosure of which is totally incorporated herein by reference.

The photoconductive imaging member may optionally contain a charge blocking layer situated between the conductive substrate and the photogenerating layer. This layer may comprise metal oxides, such as aluminum oxide and the like, or materials such as silanes and nylons. Additional examples of suitable materials include polyisobutyl methacrylate, copolymers of styrene and acrylates such as styrene/n-butyl methacrylate, copolymers of styrene and vinyl toluene, polycarbonates, alkyl substituted polystyrenes, styrene-olefin copolymers, polyesters, polyurethanes, polyterpenes, silicone elastomers, mixtures thereof, copolymers thereof, and the like. The primary purpose of this layer is to prevent charge injection from the substrate during and after charging. This layer is of a thickness of less than 50 Angstroms to about 10 microns, preferably being no more than about 2 microns.

In addition, the photoconductive imaging member may also optionally contain a second adhesive interface layer situated between the hole blocking layer and the photogenerating layer. This layer may comprise a polymeric material such as polyester, polyvinyl butyral, polyvinyl pyrrolidone and the like. Typically, this layer is of a thickness of less than about 0.6 micron.

The unsymmetrical dimers of the present invention can be readily prepared by the reaction, or condensation of, for example, about 0.5 to 2 equivalents of an aminoalkyl or aminoaryl perylene bisimide (hereinafter referred to as aminobisimide) of the type illustrated in Formula 3 with a N-alkyl or N-aryl perylene monoimide-monoanhydride (hereinafter referred to as monoimide) of the type illustrated in Formula 2 in an organic solvent, such as chloronaphthalene, trichlorobenzene, decalin, tetralin, aniline, dimethylformamide, dimethylsulfoxide, N-methylpyrrolidone and the like with the optional use of appropriate catalysts, such as zinc acetate or zinc iodide, in an amount equivalent to about 1 to 50 mole percent of the perylene. The concentration of reactants in the solvent can range from about 50 weight percent combined aminobisimide and monoimide and 50 percent solvent to about 2 percent aminobisimide and monoimide, and 98 percent solvent with a preferred range being from about 5 percent and 95 percent solvent to 20 percent aminobisimide and monoimide and 80 percent solvent. The reactants are stirred in the solvent and heated to a temperature of from about 100° C. to about 300° C., and preferably from 150° C. to 205° C. for a period of, for example, from 10 minutes to about 8 hours depending on the rate of the reaction. The mixture is subsequently cooled to a temperature of, for example, between about 25° C. to about 75° C., and the solid pigment perylene product is separated from the mother liquors by, for example, filtration through, for example, a fine porosity sintered glass filter funnel or a glass fiber filter. The perylene product may then be subjected to a number of washing steps using hot and cold solvents such as dimethyl formamide, methanol, water and alcohols. Optionally, the perylene may be washed with dilute hot or cold aqueous base solution such as a 5 percent solution of sodium hydroxide or potassium carbonate which serves to remove by conversion to a water soluble salt any residual starting monoimide and other acidic contaminants. Also, optionally the unsymmetrical dimeric perylene pigment product may also be washed with dilute acids such as 2 percent aqueous hydrochloric acid which serves to remove residual metal salts, such as for example zinc acetate which can be optionally used as a reaction catalyst. Finally, the perylene is dried either at ambient temperature or at temperatures up to 200° C. at atmospheric pressure or under vacuum. The yield of product, referred to also as "as-synthesized pigment", ranges from about 50 percent to nearly 100 percent.

More specifically, the process of the present invention comprises stirring a mixture of 1 molar equivalent of a monoimide having the structure of Formula 2 with R=n-propyl, n-phenyl and the like and 0.5 to 2 molar equivalent of an aminobisimide having the structure of Formula 3 with an R group, such as n-pentyl, benzyl and the like, which differs from that of the monoimide in N-methylpyrrolidinone solvent in an amount corresponding to about 50 parts by weight of solvent to about 2 parts of monoimide at room temperature, and, optionally, adding a catalyst known to speed up the reaction of the amines with anhydrides, such as zinc acetate dihydrate, in an amount corresponding to about 0.5 equivalent. Stirring of this mixture and heating is then accomplished until the solvent begins to reflux (N-methylpyrrolidinone boils at 202° C.) during which the aminobisimide reacts with the monoimide to form the dimeric perylene pigment molecule. Maintaining the heating and stirring at the solvent reflux temperature for a period of about 2 hours ensures completion of the reaction. Thereafter, cooling the reaction mixture to about 150° C. and filtering the mixture through a filter, such as fine-porosity sintered glass of a glass-fiber filter which has been preheated to about 150° C. with, for example, boiling solvent such as dimethylformamide (DMF). Washing the pigment in the filter with DMF heated to about 150° C. (which serves to dissolve and thus remove any residual starting monoimide or aminobisimide depending on which reactant was used in excess) is accomplished until the color of the filtrate wash becomes, and remains, colorless or light orange. The pigment is then washed with DMF at room temperature, about 25° C., and is finally washed with acetone, methanol or a similar low-boiling solvent and is dried at 60° C. (degrees Centigrade throughout) in an oven.

Optionally, water can be used in the final washing step and the pigment wet cake can be freeze dried. This process generally provides free flowing pigment which is more readily redispersed in solvent than solvent washed pigment which has been dried using other methods which can sometimes result in the formation of a hard, caked mass of pigment which is difficult to redisperse.

Also optionally, in situations where the hot, for example 60 to 150° C., solvent, for example DMF, fails to completely remove any excess starting monoimide from the dimer the product can be dispersed in dilute, for example 1 to 5 percent of aqueous potassium hydroxide for a period of time of from about 1 hour to about 24 hours, and preferably from about 7 to about 20 hours, at room temperature, about 25° C. to about 90° C., which treatment converts the monoimide to a water-soluble, deep purple-colored dipotassium carboxylate salt, followed by filtration and washing the solid with water until the filtrate becomes colorless. The residual starting anhydride in the product can be detected by known spectroscopic methods such as FT-IR and NMR, or by a color spot test in which the product is stirred in dilute, for example about 2 percent of aqueous potassium hydroxide solution with the presence of monoanhydride being indicated by the development of a deep reddish purple color characteristic of the dipotassium salt of the monoimide.

Optionally, in situations where a metal-containing catalyst, such as zinc acetate dihydrate, has been used to improve the reaction rate the product can be stirred in a dilute acid, such as 2 percent aqueous hydrochloric acid, which process converts the residual metal to water soluble salts, which can then be removed by filtration and washing with water.

A monoimide of the type illustrated in Formula 2 is stirred at room temperature in a nonpolar organic solvent, such as heptane, octane, benzene, toluene, xylene, decalin and the like, in an amount corresponding to from about 2 parts monoimide to about 98 parts solvent to about 30 parts monoimide to about 70 parts solvent, followed by adding from about 5 molar equivalents to 100 molar equivalents of a diamine such as 1,3-diaminopropane or 1,4-phenylene diamine, stirring and heating the mixture at reflux (100 to 200° C. depending on the solvent) for from 1 to about 24 hours, cooling the resultant mixture to from about 25 to about 90° C., filtering to separate the product, washing the product in the filter funnel with the reaction solvent in an amount corresponding to from about 10 percent to about 100 percent of the original amount used in the reaction to remove the excess starting diamine and drying at from room temperature to about 200° C.

A preferred process uses toluene (reflux temperature of about 115° C.) or xylene (reflux temperature of about 150° C.) as the reaction solvent, a reactant concentration of from 2.5 to 10 parts of monoimide to 97.5 to 90 parts of solvent, an about 5 to 20 fold molar excess of the diamine, a reaction time of from 2 to 8 hours, cooling the reaction mixture to room temperature prior to filtration, washing the solid in the filter with 3 separate portions of the reaction solvent, each corresponding to about 10 percent of the original amount used in the synthesis, and drying the crude product at from room temperature to 100° C.

The resultant crude aminoalkyl or aminoaryl bisimide product, which may contain both starting monoimide and the dimer formed from the condensation of 2 moles of monoimide with the same diamine molecule, i.e., the symmetrical dimer corresponding to Formula 1 wherein $R_1=R_2$ is purified to a purity of, for example, 99 to 99.95 percent as follows:

The crude unsymmetrical perylene product is stirred in a carboxylic acid such as formic, acetic, propionic or trifluoroacetic acid in an amount corresponding to from about 1 part crude aminobisimide to 99 parts acid to 25 parts aminobisimide to 75 parts of acid at a temperature of from 25° C. to about 140° C. (this treatment converts the aminobisimide to a soluble carboxylate salt), filtering the resultant mixture at a temperature of from 25° C. to about 125° C. to separate any residual monoimide or dimer, both of which are essentially insoluble in the carboxylic acid, precipitation of the dissolved aminobisimide either by cooling the filtrate to room temperature or by addition of a suitable precipitant solvent, such as water, methanol, isopropanol, diethyl ether, toluene, or dichloromethane in an amount corresponding to from about 0.25 to about 5 times the volume of the filtrate, filtering and washing of the precipitated carboxylate salt of the aminobisimide with a solvent such as water, methanol, isopropanol, diethyl ether, toluene, or dichloromethane to remove the residual acid and drying the product at from room temperature to about 90° C. In the purification process, the carboxylic acid chosen and temperature required to dissolve the aminobisimide, and the precipitation method used will depend on the solubility and reactivity of the particular aminobisimide being purified.

A preferred purification solvent is acetic acid in an amount corresponding to from 99 to 90 parts of the crude product; at a reflux temperature of 118° C., the preferred filtration temperature is from 80° C. to 115° C., the filtrate is preferably cooled to from 25° C. to about 50° C. prior to addition of the precipitant solvent, the preferred precipitant solvent being isopropanol in an amount corresponding to from about 0.5 to about 2 parts of the original filtrate volume, the wash solvent is preferably isopropanol or methanol in an amount corresponding to 30 to 100 percent of the original filtrate volume and the product is preferably dried at a temperature of from 25° C. to 60° C.

The environmentally friendly unsymmetrical photogenerating compounds of the present invention in embodiments thereof enable enhanced photosensitivity in the visible wavelength range. In particular, imaging members with photosensitivity at wavelengths of from about 400 to about 700 nanometers are provided in embodiments of the present invention, which renders them particularly useful for color copying and imaging and printing applications, such as red LED and diode laser printing processes, which typically require sensitivity from about 600 to about 700 nanometers.

The present invention also encompasses imaging and printing devices and methods for generating images with the photoconductive imaging members disclosed herein. The method comprises the steps of generating an electrostatic latent image on a photoconductive imaging member of the present invention, developing the latent image with a toner comprised of resin, colorant like carbon black, and a charge additive, and transferring the developed electrostatic image to a substrate. Optionally, the transferred image can be permanently affixed to the substrate. Development of the image may be achieved by a number of methods, such as cascade, touchdown, powder cloud, magnetic brush, and the like. Transfer of the developed image to a substrate, such as paper, may be by any method, including those making use of a corotron or a biased roll. The fixing step may be performed by means of any suitable method, such as flash fusing, heat fusing, pressure fusing, vapor fusing, and the like. Any substrate selected for xerographic copiers and printers, including digital copiers, may be used as a substrate, such as paper, transparency, and the like.

Specific embodiments of the invention will now be described in detail. These Examples are intended to be illustrative, and the invention is not limited to the materials, conditions, or process parameters set forth in these embodiments. All parts and percentages are by weight unless otherwise indicated.

Synthesis Examples

The starting monoanhydride monoimides (Formula 2) in the following Examples were prepared by the methods described in U.S. Pat. No. 4,501,906, the disclosure of which is totally incorporated herein by reference, or by minor adaptations of the processes described therein. The structures of the intermediate aminobisimides (Formula 3) and the product dimers described below were mainly established by $^1$H and $^{13}$C nuclear magnetic resonance spectrometry in solvent mixtures containing trifluoroacetic acid. Visible absorption spectra in trifluoroacetic acid-methylene chloride solution were also measured for each product. The bisimide dimers evidence absorbence maxima at about 500 and 540 nanometers which is diagnostic for the perylene bisimide chromophore in this solvent system. Trivial names, based on the substituent and bridging groups and referring to the unsubstituted perylene bisimide moiety as the imidoperyleneimido group have been used. To avoid or minimize confusion and ambiguity, the compounds are also described in relation to the structures shown in Formula 1.

The synthesis Examples that follow are representative of the general synthesis and purification processes selected.

Synthesis of Aminobisimides
n-Propylimido-4-aminobutylimidoperylene (Formula 3, $R_2$=n-Propyl, X=1,4-Butanediyl)

A dispersion of 34.6 grams (0.08 mole) of mono-n-propylimidoperylene monoanhydride (Formula 2, $R_1$=n-propyl) in 1.2 liters of toluene at room temperature, about 25° C. (degrees Centigrade throughout), was treated with 1,4-diaminobutane (70.5 grams, 0.80 mole). The mixture was stirred and heated at reflux (111° C.) for 3 hours, then was cooled to room temperature and was filtered. The resulting solid was washed with 3×50 milliliter portions of toluene and was dried at 60° C. to provide 38.6 grams of crude aminobisimide.

The crude product resulting was stirred in 1 liter of glacial acetic acid and the mixture was warmed to reflux (118° C.) for 1 hour. The mixture was filtered while still hot and the solid was washed with about 100 milliliters of boiling acetic acid. The solid was dried to provide 15.5 grams of dark brown solid which was identified as the symmetrical dimer (Formula 1, $R_1$=$R_2$=n-propyl, X=1,4-tetramethylene).

The filtrate was cooled to 25° C., then was stirred and treated with 1 liter of isopropyl alcohol. The precipitated product was filtered and was then washed with 3×25 milliliter portions of isopropyl alcohol; then was dried at 60° C. to give the pure aminobisimide as its acetate salt, 26.0 grams (58 percent yield). Analysis: C, 69.45; H, 4.99; N, 7.42. $C_{33}H_{29}N_3O_6$. requires: C, 70.33; H, 5.19; N, 7.46.
n-Pentylimido-3-aminopropylimidoperylene (Formula 3, $R_2$=n-Pentyl, X=1,3-Propylene)

n-Pentylimidoperylene monoanhydride, $R_1$=n-pentyl, (18.4 grams, 0.04 mole) was dispersed in 500 milliliters of toluene. 1,3-Diaminopropane (29.7 grams, 0.40 mole) was added and the mixture was stirred and heated to reflux for 3 hours, then was cooled to room temperature and filtered. The solid resulting was washed with 2×50 milliliter portions of toluene and was dried at 60° C. to give 17.7 grams of crude aminobisimide.

The crude product was stirred in 500 milliliters of boiling acetic acid. The mixture resulting was then filtered hot and the solid resulting was washed with 2×25 milliliter portions of boiling acetic acid. The resultant solid was dried to give 4.0 grams of the symmetrical dimer (Formula 1 with $R_1$=$R_2$+n-pentyl and X=1,3-propylene). The filtrate was stirred and was treated with 2 liters of isopropyl alcohol. The resultant mixture was stirred for 2 hours, then was filtered. The solid was washed with isopropyl alcohol and was dried at 60° C. to give 16.1 grams (70 percent) of the aminobisimide as its acetate salt. Analysis: C, 69.90; H, 5.35; N, 7.15. $C_{34}H_{31}N_3O_6$ requires: C, 70.70; H, 5.41; N, 7.15.
n-Benzlimido-3-aminopropylimidoperylene (Formula 3, $R_2$=Benzyl, X=1.3-Propylene)

To a suspension of benzylimidoperylene monoanhydride (Formula 2, $R_1$=benzyl), 19.24 grams, 0.040 mole, in 400 milliliters of toluene were added 29.6 grams (33.4 milliliters, 040 mole) of 1,3-diaminopropane. The resulting mixture was heated at reflux for 3 hours, then was cooled to room temperature, and filtered. The resulting solid was washed with 3×50 milliliters portions of methanol. Drying at 60° C. provided 21.8 grams of crude product.

The crude product was stirred at reflux in 700 milliliters of acetic acid and the resultant suspension was filtered at 100 to 0° C. The solid was washed with 2×100 milliliter portions of boiling acetic acid, then with 3×50 milliliters portions of methanol. The filtrate was cooled to 25° C. and stirred and treated with 750 milliliters of methanol. The precipitated product was filtered and was washed with 3×50 milliliter portions of methanol, and then was dried at 60° C. to provide 8.1 grams of product as a black solid. An NMR spectrum showed it to be the pure acetate salt.

Similar procedures as above were used to prepare the other aminobisimide intermediates used in the dimer syntheses described below.

Syntheses of Terminally Unsymmetrical Dimers

The dimers described in the following Examples are listed in Table 1 together with the synthesis yields.

EXAMPLE 1

1-(N-butylimidoperyieneimido)-2-(n-pentylimidoperyeneimido)ethane, Formula 1, $R_1$=n-Butyl, $R_2$=n-Pentyl and X=Ethylene A mixture of N-(n-butyl)-N'-(2-aminoethyl)perylene bisimide, Formula 3, $R_2$=n-butyl, X=ethylene (2.25 grams, 0.0045 mole) and n-pentylimidoperylene monoanhydride, Formula 2, $R_1$=n-pentyl (2.45 grams, 0.0050 mole) was stirred and heated to reflux in 300 milliliters of 1-methyl-2-pyrrolidinone (NMP) for 2 hours. The resultant suspension was cooled to about 150° C. and was filtered through a filter funnel which had been preheated with boiling dimethylformamide (DMF) solvent. The solid resulting was washed with 3×50 milliliter portions of boiling DMF, then with 50 milliliters of cold (i.e. 25° C.) DMF followed by 3×50 milliliter portions of methanol. The resulting wet cake was stirred in 300 milliliters of 2 percent aqueous potassium hydroxide at room temperature for 18 hours, then was filtered and the solid was washed with 3×50 milliliter portions of water, then with 10 milliliters of methanol and dried at 60° C. to provide 3.11 grams (74 percent) of the pure, about 99.5 percent, unsymmetrical dimer as a brown solid. A proton nmr spectrum of this product in trifluoroacetic acid-d/deuterochloroform (ca. 2:1) evidenced peaks attributable to the pure dimer, and only minor foreign peaks signals indicative of <1 percent of detectable impurities.

EXAMPLE 2

1-(n-Propylimidoperyleneimido)-3-(3-methoxypropylimidoperylene imido) propane

A mixture of 2.47 grams (0045 mole) of N-(n-propyl)-N'-(3-aminopropyl)perylene bisimide, Formula 3, $R_2$=n-propyl, X=1,3-propylene and 2.32 grams (0.0050 mole) of mono-3-methoxypropylimidoperylene monoanhydride, Formula 2, $R_1$=3-methoxypropyl, in 300 milliliters of NMP was stirred and heated to reflux (202° C.) for 3½ hours. The reaction mixture was cooled and filtered through a preheated funnel and the solid was washed with 3×50 milliliter portions of boiling DMF, followed by 3×10 milliliter portions of methanol. The product was stirred overnight, about 8 hours throughout, in 125 milliliters of water containing 2 grams of potassium hydroxide. The dispersion resulting was filtered and the solid was washed with 50 milliliters of water followed by 3×50 milliliter portions of boiling water, then was dried at 60° C. to provide 2.4 grams (57 percent) of the pure, about 99.8 percent, unsymmetrical dimer.

EXAMPLE 3

1-(n-Propylimidoperyleneimido)-3-(n-butylimidoperyleneimido)propane, Formula 1, $R^1$=n-Propyl, $R_2$=n-Butyl and X=1,3-Propylene N-(n-propyl)-N'-(3-aminopropyl)perylene bisimide, Formula 3, $R_2$=n-propyl, X=1,3-propylene, (2.47 grams, 0.0045 mole) and mono-n-butylimidoperylene monoanhydride, Formula 2, $R_1$=n-butyl were condensed using the same molar quantities, reaction and purification methods as in Example 2 to provide 2.3 grams (61 percent) of the above black unsymmetrical dimer product.

EXAMPLE 4

1-(n-Propylimidoperyleneimido)-3-(n-pentylimidoperyleneimido) propane, Formula 1, $R_1$=n-Propyl, $R_2$=n-Pentyl and X=1,3-Propylene N-(n-propyl)-N'-(3-aminopropyl)perylene bisimide, Formula 3, $R_2$=n-propyl, X=1,3-propylene and mono-n-pentylimidoperylene monoanhydride, Formula 2, $R_1$=n-pentyl were condensed using the same molar quantities, reaction and purification methods as in Example 2 to provide 2.8 grams (67 percent) of the above black unsymmetrical dimer.

EXAMPLE 5+

1-(n-Propylimidoperyleneimido)-3-(2-methylbutylimidoperyleneimido) propane, Formula 1, $R_1$=n-Propyl, $R_2$=2-Methylbutyl and X=1,3-Propylene N-(n-propyl)-N'-(3-aminopropyl)perylene bisimide, Formula 3, $R_2$=n-propyl, X=1,3-propylene and mono-(2-methylbutyl)imidoperylene monoanhydride, Formula 2, $R_1$=2-methylbutyl were condensed using the same molar quantities, reaction and purification methods as in Example 2 to provide 2.4 grams (57 percent) of the above black unsymmetrical dimer.

EXAMPLE 6

1-(n-Propylimidoperyleneimido)-3-(2-methylbutylimidoperyleneimido) propane, Formula 1, $R_1$=n-Propyl, $R_2$=2-Methylbutyl and X=1,3-Propylene N-(n-propyl)-N'-(3-aminopropyl)perylene bisimide, Formula 3, $R_2$=n-propyl, X=1,3-propylene and mono-n-hexylimidoperylene monoanhydride, Formula 2, $R_1$=2-methylbutyl were condensed using the same molar quantities, reaction and purification methods as in Example 2 to provide 21.8 grams (42 percent) of the above black unsymmetrical dimer.

EXAMPLE 7

1-(n-Butylimidoperyleneimido)-3-(isobutylimidoperyleneimido)propane, Formula 1, $R_1$=n-Butyl, $R_2$=Isobutyl and X=1,3-Propylene A mixture of N-(n-butyl)-N'-(3-aminopropyl)perylene bisimide, Formula 3, $R_2$=n-butyl, X=1,3-propylene, (2.02 gram, 0.004 mole) and mono(isobutylimido)perylene monoanhydride, Formula 2, $R_1$=isobutyl, (2.24 grams, 0.005 mole) in 200 milliliters of NMP was stirred and heated at reflux for 1¼ hour. The suspension was cooled to 150° C. and was filtered. The solid was washed with 3×75 milliliter portions of boiling DMF, then with 25 milliliters of cold DMF, followed by 3×20 milliliter portions of methanol. The crude product was stirred in 100 milliliters of 2 percent aqueous potassium hydroxide for 2 days and the resultant suspension was filtered and was washed with 2×100 milliliters portions of cold water, then with 2×50 milliliter portions of boiling water followed by 2×20 milliliter portions of methanol. The product was dried at 60° C. to provide 2.9 grams, 76 percent of the pure, 99.8 percent, unsymmetrical dimer as a black solid.

EXAMPLE 8

1-(n-Butylimidoperyleneimido)-3-(3-methylbutylimidoperyleneimido)propane, Formula 1, $R_1$=n-Butyl, $R_2$=3-Methylbutyl and X=1,3-Propylene N-(n-butyl)-N'-(3-aminopropyl)perylene bisimide, Formula 3, $R_2$=n-butyl, X=1,3-propylene and mono-(3-methylbutylimido)perylene monoanhydride, Formula 2, $R_1$=3-methylbutyl were condensed using the same molar quantities, reaction conditions and purification methods as in Example 7 to provide 3.2 grams (85 percent) of black pure, 99.9 percent, dimer.

EXAMPLE 9

1-(n-Butylimidoperyleneimido)-3-(n-hexylimidoperyleneimido)propane, Formula 1, $R_1$=n-Butyl, $R_2$=n-Hexyl and X=1.3-Propylene N-(n-butyl)-N'-(3-aminopropyl)perylene bisimide, Formula 3, $R_2$=n-butyl, X=1,3-propylene, and mono-n-hexylimidoperylene monoanhydride, Formula 2, $R_1$=n-hexyl were condensed using the same molar quantities, reaction and purification methods as in Example 7 to provide 2.9 grams (76 percent) of the above black pure unsymmetrical dimer.

EXAMPLE 10

1-(n-pentylimidoperyleneimido)-3-(n-propylimidoperyleneimido)propane, Formula 1, $R_1$=n-Pentyl, $R_2$=n-Propyl and X=1,3-Propylene A suspension of N-(n-pentyl)-N'-(3-aminopropyl) perylene bisimide, Formula 3, $R_2$=n-pentyl, X=1,3-propylene (2.60 grams, 0.0045 mole) and mono-(n-propylimido)perylene monoanhydride, Formula 2, $R_1$=n-propyl, (2.17 grams, 0.0050 mole) in 300 milliliters of NMP (1-methyl-2 -pyrrolidinone) was stirred and heated at reflux for 90 minutes. The reaction mixture was cooled to 155° C. and was filtered. The solid was washed with 3×50 milliliter portions of boiling DM, then with 3×20 milliliter portions of methanol and was dried at 60° C. to give 3.5 grams (84 percent) of product which was shown by nmr to be pure, about 99.95 percent, unsymmetrical dimer.

EXAMPLE 11

1-(n-Pentylimidoperyleneimido)-3-(n-butylimidoperyleneimido)propane, Formula 1, $R_1$=n-Pentyl, $R_2$=n-Butyl and X=1,3-Propylene N-(n-pentyl)-N'-(3-aminopropyl)perylene bisimide, Formula 3, $R_2$=n-pentyl, X=1,3-propylene, and mono-n-butylimidoperylene monoanhydride, Formula 2, $R_1$=n-butyl were condensed using the same molar quantities, reaction and purification methods as in Example 10 to provide 3.6 grams (85 percent) of black pure unsymmetrical dimer.

EXAMPLE 12

1-(n-Pentylimidoperyleneimido)-3-(3-methylbutylimidoperyleneimido)propane, Formula 1, $R_1$=n-Pentyl, $R_2$=3-Methylbutyl and X=1,3-Propylene N-(n-pentyl)-N'-(3-aminopropyl)perylene bisimide, Formula 3, $R_2$=n-pentyl, X=1,3-propylene, and mono-(3-methylbutyl)imidoperylene monoanhydride, Formula 2, $R_1$=3-methylbutyl, were condensed using the same molar quantities, reaction and purification methods as in Example 10 to provide 3.7 grams (86 percent) of black pure unsymmetrical dimer.

EXAMPLE 13

1-(n-Pentylimidoperyleneimido)-3-(benzylimidoperyleneimido) propane, Formula 1, $R_1$=n-Pentyl, $R_2$=Benzyl and X=1,3-Propylene A mixture of N-(n-pentyl)-N'-(3-aminopropyl)perylene bisimide, Formula 3, $R_2$=n-pentyl, X=1,3-propylene, (1.14 grams, 0.0022 mole) and mono(benzylimidoperylene) monoanhydride, Formula 2, R=benzyl, (0.962 gram, 0.0020 mole) was stirred and heated to reflux in 75 milliliters of NMP for 4 hours, then was cooled to 150° C. and was filtered. The solid resulting was washed with 3×50 milliliter portions of boiling DMF, then with 3×20 milliliter portions of methanol. Drying at 60° C. provided the above dimer as a black solid, 1.73 grams (88 percent).

EXAMPLE 14

1-(n-Pentylimidoperyleneimido)-3-(3-chlorobenzylimidoperyleneimido)propane, Formula 1, $R_1$=n-Pentyl, $R_2$=Benzyl and X=1,3-Propylene A mixture of N-(n-pentyl)-N'-(3-aminopropyl)perylene bisimide, Formula 3, $R_2$=n-pentyl, X=1,3-propylene, (1.14 grams, 0.0022 mole) and mono(3-chlorobenzylimidoperylene)monoanhydride, Formula 2, R=3-chlorobenzyl, (1.04 gram, 0.0020 mole) was stirred and heated to reflux in 75 milliliters of NMP for 3½ hours, then was cooled to 150° C. and was filtered. The solid was washed with 3×50 milliliter portions of boiling DMF, then with 3×20 milliliters portions of methanol. Drying at 60° C. provided the above dimer as a black solid, 1.78 grams (89 percent).

EXAMPLE 15

1-(2-methylbutylimidoperyleneimido)-3-(n-butylimidoperyleneimido)propane, Formula 1, $R_1$=2-Methylbutyl, $R_2$=n-Butyl and X=1,3-Propylene A dispersion of N-(2-methylbutyl)-N'-(3-aminopropyl) perylene bisimide, Formula 3, $R_2$=2-methylbutyl, X=1,3-propylene, (2.60 grams, 0.0045 mole and mono(n-butylimido)perylene monoanhydride, Formula 2, $R_1$=n-butyl, (2.24 grams, 0.005 mole) was stirred and heated to reflux in 300 milliliters of NMP for 1¼ hours. The mixture was cooled to 150° C., then was filtered. The solid was washed with 3×50 milliliter portions of boiling DMF, then with 3×10 milliliter portions of methanol. Drying at 60° C. provided the pure, about 99.9 percent, dimer as a black solid, 3.6 grams (85 percent).

EXAMPLE 16

1-(2-Methylbutylimidoperyleneimido)-3-(n-pentylimidoperyleneimido)propane, Formula 1, $R_1$=2-Methylbutyl, $R_2$=n-Pentyl and X=13-Propylene N-(2-methylbutyl)-N'-(3-aminopropyl)perylene bisimide, Formula 3, $R_2$=2-methylbutyl, X=1,3-propylene, and mono-(n-pentyl)imidoperylene monoanhydride, Formula 2, $R_1$=n-pentyl, were condensed using the same molar quantities, reaction and purification methods as in Example 15 to provide 3.7 grams (86 percent) of the above black pure dimer.

EXAMPLE 17

1-(2-Methylbutylimidoperyleneimido)-3-(n-hexylimidoperyleneimido)propane, Formula 1, $R_1$=2-Methylbutyl, $R_2$=n-Hexyl and X=1,3-Propylene N-(2-methylbutyl)-N'-(3-aminopropyl)perylene bisimide, Formula 3, $R_2$=2-methylbutyl, X=1,3-propylene, and mono- (n-hexyl)imidoperylene monoanhydride, Formula 2, $R_1$=n-hexyl, were condensed using the same molar quantities, reaction and purification methods as in Example 15 to provide 3.82 grams (85 percent) of the above black pure dimer.

EXAMPLE 18

1-(2-Methylbutylimidoperyleneimido)-3-(benzylimidoperyleneimido) propane. Formula 1, $R_1$=2-Methylbutyl, $R_2$ Benzyl and X=1,3-Propylene N-(2-methylbutyl)-N'-(3-aminopropyl)perylene bisimide, Formula 3, $R_2$=2-methylbutyl, X=1,3-propylene, and mono-(benzyl) imidoperylene monoanhydride, Formula 2, $R_1$=benzyl, were condensed using the same molar quantities, reaction and purification methods as in Example 15 to provide 3.9 grams (88 percent) of the above black pure dimer.

EXAMPLE 19

1-(Benzylimidoperyleneimido)-3-(n-butylimidoperyieneimido)propane, Formula 1, $R_1$=Benzyl, $R_2$=n-Butyl, X=1,3-Propylene A suspension of N-(benzyl)-N'-(3-aminopropyl)perylene bisimide, Formula 3, $R_2$=benzyl, X=1,3-propylene (2.68 grams, 0.0045 mole) and mono(n-butylimido)perylene monoanhydride, Formula 2, $R_1$=n-butyl (2.24 grams, 0.0050 mole) in 300 milliliters of NMP was stirred and heated to reflux for 1¼ hours. The mixture was cooled to 150° C., then was filtered. The solid was washed with 3×50 milliliter portions of boiling DMF, followed by 3×10 milliliter portions of methanol. The resulting wet cake was stirred in 125 milliliters of water containing 2 grams of potassium hydroxide overnight, about 18 hours, the suspension was filtered, and the solid washed with 3×50 milliliter portions of boiling water, then was dried at 60° C. to provide 3.1 grams (71 percent) of the above unsymmetrical pure dimer.

EXAMPLE 20

1-(Benzylimidoperyleneimido)-3-(n-phenethylimidoperyleneimido)propane, Formula 1, $R_1$=Benzyl, $R_2$=Phenethyl, X=1,3-Propylene N-(benzyl)-N'-(3-aminopropyl)perylene bisimide, Formula 3, $R_2$=benzyl, X=1,3-propylene, and mono-(phenethyl)imidoperylene monoanhydride, Formula 2, $R_1$=benzyl, were condensed using the same molar quantities, reaction process and purification methods as in Example 19 to provide 2.9 grams (64 percent) of the above black dimer.

EXAMPLE 21

1-(N-propylimidoperyleneimido)-4-(2-methylbutylimidoperyleneimido)butane, Formula 1, $R_1$=n-Propyl, $R_2$=2-Methylbutyl, X=1,4-Tetramethylene N-(n-propyl)-N'-(4-aminobutyl)perylene bisimide, Formula 3, $R_2$=n-propyl, X=1,4-tetramethylene (2.33 grams, 0.0045 mole) and mono(2-methylbutylimido)perylene monoanhydride, Formula 2, $R_1$=2-methylbutyl (2.46 grams, 0.0050 mole) were heated to reflux for 2 hours in 300 milliliters of NMP. The mixture was cooled to 150° C. and was filtered. The solid resulting was washed with 3×50 milliliter portions of boiling DMF and 3×20 milliliter portions of methanol. The resulting wet cake was stirred in 300 milliliters of 2 percent aqueous potassium hydroxide for about 20 hours and the resultant suspension was filtered. The solid was washed with 3×50 milliliters of water and 10 milliliters of methanol, then was dried at 60° C. to provide 3.20 grams (75 percent) of the above dimer as a pure red solid.

EXAMPLE 22

1-(N-Propylimidoperyleneimido)-6-(3-chlorobenzylimidoperyleneimido)hexane, Formula 1, $R_1$=n-Propyl, $R_2$=3-Chlorobenzyl, X=1.6-hexamethylene A mixture of N-(propyl)-N'-(6-aminohexyl)perylene bisimide, Formula 3, $R_2$=n-propyl and X=1,6-hexamethylene (1.17 gram, 0.0022 mole) and mono-(3-chlorobenzylimido)perylene monoanhydride, Formula 2, $R_1$=3-chlorobenzyl (1.029 gram, 0.0020 mole) in 150 milliliters of NMP was stirred and heated at reflux for 4 hours. The resulting suspension was cooled to 160° C., then was filtered. The resulting solid was washed with 3×50 milliliter portions of boiling DMF, then with 3×20 milliliter portions of methanol and was dried at 60° C. to provide 1.9 grams (92 percent) of the above dimer as a pure black solid.

EXAMPLE 23

1-(N-butylimidoperyleneimido)-4-(n-hexylimidoperyleneimido)butane, Formula 1, $R_1$=n-Butyl, $R_2$=n-Hexyl, X=1,6-Hexamethylene N-(butyl)-N'-(6-aminohexyl)perylene bisimide, Formula 3, $R_2$=n-butyl, X=1,6-hexamethylene, and mono-(n-hexyl) imidoperylene monoanhydride, Formula 2, $R_1$=n-hexyl, were condensed using the same molar quantities, reaction process and purification methods as in Example 21 to provide 3.8 grams (82 percent) of the above black unsymmetrical pure dimer.

Preparation of Dispersions of Unsymmetrical Perylene Bisimide Dimers in Poly(vinyl acetate)

To demonstrate the application of the invention unsymmetrical dimers as dispersed colorants, the following was accomplished. 0.2 Gram of a perylene dimer pigment, such as that of Example 1, 8 milliliters of a 1.5 percent W/W solution of poly(vinyl acetate) ($M_w$=45,000; Polysciences, Inc.) in dichloromethane and 70 grams of ⅛ inch diameter stainless balls were charged into a 30 milliliter glass jar. The jar was sealed and the mixture was milled on a roll mill for 3 to 5 days until the pigment particles were below about 1 micron, for example about 0.5 micron in volume diameter size as determined by a Coulter Counter, and were finely dispersed. Colored films were prepared by coating a clear plastic sheet, such as MYLAR® polyester, with the dispersion using a #8 wire-wound rod. The nominal film wet thickness was about 20 microns, and the dried film was about 1 micron. The films, comprised of about 60 percent of well-dispersed dimer pigment in PVA, had an optical density of about 1 and exhibited a variety of colors.

The range of colors available by varying the $R_1$, $R_2$ and X groups of the unsymmetrical dimers of this invention is illustrated in Table 1, and which table provides the color of films prepared from 23 representative compounds.

TABLE 1

Synthesis Yields and Color of Raw Pigments and PVA-Dispersed Films of Unsymmetrical Perylene Bisimide Dimers

| Example Number | R$_1$ (Amino imide) | R$_2$ (Monoimide) | X | % Yield | As-synthesized Color | PVA Dispersion Color |
|---|---|---|---|---|---|---|
| 1 | n-Butyl | n-Pentyl | Ethylene | 74 | Brown | Maroon |
| 2 | n-Propyl | 3-Methoxypropyl | 1,3-Propylene | 57 | Black | Green |
| 3 | n-Propyl | n-Butyl | 1,3-Propylene | 61 | Black | Green |
| 4 | n-Propyl | n-Pentyl | 1,3-Propylene | 67 | Black | Dark Green |
| 5 | n-Propyl | 2-Methylbutyl | 1,3-Propylene | 57 | Black | Dark Green |
| 6 | n-Propyl | n-Hexyl | 1,3-Propylene | 42 | Black | Green |
| 7 | n-Butyl | Isobutyl | 1,3-Propylene | 84 | Black | Dark Green |
| 8 | n-Butyl | 3-Methylbutyl | 1,3-Propylene | 85 | Black | Dark Green |
| 9 | n-Butyl | n-Hexyl | 1,3-Propylene | 76 | Black | Dark Green |
| 10 | Benzyl | n-Butyl | 1,3-Propylene | 71 | Black | Green |
| 11 | n-Pentyl | n-Propyl | 1,3-Propylene | 84 | Black | Dark Green |
| 12 | n-Pentyl | n-Butyl | 1,3-Propylene | 85 | Black | Dark Green |
| 13 | n-Pentyl | 3-Methylbutyl | 1,3-Propylene | 88 | Black | Dark Green |
| 14 | n-Pentyl | Benzyl | 1,3-Propylene | 88 | Black | Green |
| 15 | n-Pentyl | 3-Chlorobenzyl | 1,3-Propylene | 89 | Black | Green |
| 16 | 2-Methylbutyl | n-Butyl | 1,3-Propylene | 85 | Black | Black |
| 17 | 2-Methylbutyl | n-Pentyl | 1,3-Propylene | 86 | Black | Red |
| 18 | 2-Methylbutyl | n-Hexyl | 1,3-Propylene | 85 | Black | Brown |
| 19 | 2-Methylbutyl | Benzyl | 1,3-Propylene | 88 | Black | Green |
| 20 | Benzyl | Phenethyl | 1,3-Propylene | 64 | Black | Green |
| 21 | n-Propyl | 2-Methylbutyl | 1,4-Tetramethylene | 75 | Red | Red |
| 22 | n-Propyl | 3-Chlorobenzyl | 1,6-Hexamethylene | 92 | Black | Burgundy |
| 23 | n-Butyl | n-Hexyl | 1,6-Hexamethylene | 82 | Brown | Red |

Xerographic Evaluation of Unsymmetrical Perylene Bisimide Dimers

Photoresponsive imaging members were fabricated with the unsymmetrical perylene dimer pigments obtained by Synthesis Examples 1 to 23. These photoresponsive, or photoconductive imaging members are generally known as dual layer photoreceptors containing a photogenerator layer, and thereover a charge transport layer. The photogenerator layer was prepared from a pigment dispersion as follows: 0.2 gram of the perylene dimer pigment was mixed with 0.05 gram of polyvinylcarbazole (PVK) polymer and 8.1 milliliters of methylene chloride in a 30 milliliter glass bottle containing 70 grams of ⅛-inch stainless steel balls. The bottle was placed on a roller mill and the dispersion was milled for 4 days. Using a film applicator of 1.5 mil gap, the pigment dispersion was coated to form the photogenerator layer on a titanized MYLAR® substrate of 75 microns in thickness, which had a gamma amino propyl triethoxy silane layer, 0.1 micron in thickness, thereover, and E.I. DuPont 49,000 polyester adhesive thereon in a thickness of 0.1 micron. Thereafter, the photogenerator layer formed was dried in a forced air oven at 135° C. for 20 minutes. Photogenerator layers for each device were each overcoated with an amine charge transport layer prepared as follows. A transport layer solution was generated by mixing 8.3 grams of MAKROLON™, a polycarbonate resin, 4,4 grams of N,N'-diphenyl-N, N'-bis(3-methylphenyl)-(1, 1 '-biphenyl)-4,4'-diamine and 82.3 grams of methylene chloride. The solution was coated onto the above photogenerating layer using a film applicator of 10 mil gap. The resulting members were dried at 135° C. in a forced air oven for 20 minutes. The final dried thickness of transport layer was 20 microns.

The xerographic electrical properties of each imaging member were then determined by electrostatically charging its surface with a corona discharging device until the surface potential, as measured by a capacitively coupled probe attached to an electrometer, attained an initial value $V_o$=800 volts. After resting for 0.5 second in the dark, the charged member reached a surface potential of $V_{ddp}$, dark development potential, and was then exposed to light from a filtered xenon lamp. A reduction in the surface potential to $V_{bg}$, background potential due to photodischarge effect, was observed. The dark decay in volt/second was calculated as $(V_o-V_{ddp})/0.5$. The lower the dark decay value, the superior is the ability of the member to retain its charge prior to exposure by light. Similarly, the lower the $V_{ddp}$, the poorer is the charging behavior of the member. The percent photodischarge was calculated as 100 percent×$(V_{ddp}-V_{bg})V_{ddp}$. The light energy used to photodischarge the imaging member during the exposure step was measured with a light meter. The photosensitivity of the imaging member can be described in terms of $E_{1/2}$, amount of exposure energy in erg/cm$^2$ required to achieve 50 percent photodischarge from the dark development potential. The higher the photosensitivity, the smaller the $E_{1/2}$ value. High photosensitivity (lower $E_{1/2}$ value), lower dark decay and high charging are desired for the improved performance of xerographic imaging members.

The following Table 2 summarizes the xerographic electrical results obtained for devices generated with the above 23 Example unsymmetrical pigments. The exposed light used was at a wavelength of 620 or 500 nanometers.

TABLE 2

Xerographic Electrical Properties of Terminally Unsymmetrical Perylene Dimers

| Example Number | R1 (Aminoimide) | R2 (Monoimide) | X | $V_{ddp}$ (-V) | DD [500 ms] | $E_{1/2}$ Ergs/cm$^2$ | Expose l(nm) |
|---|---|---|---|---|---|---|---|
| 1 | n-Butyl | n-Pentyl | Ethylene | 800 | 96.1 | 4.67 | 500 |
| 2 | n-Propyl | 3-Methoxypropyl | 1,3-propylene | 800 | 11.5 | 14.97 | 620 |
| 3 | n-Propyl | n-Butyl | " | 800 | 27.9 | 9.75 | 620 |
| 4 | n-Propyl | n-Pentyl | " | 800 | 32.1 | 4.95 | 620 |
| 5 | n-Propyl | 2-Methylbutyl | " | 800 | 50 | 5.5 | 620 |
| 6 | n-Propyl | n-Hexyl | " | 800 | 82.3 | 7.06 | 620 |
| 7 | n-Butyl | Isobutyl | " | 800 | 19.1 | 5.45 | 620 |
| 8 | n-Butyl | 3-Methylbutyl | " | 800 | 22.8 | 5.07 | 620 |
| 9 | n-Butyl | n-Hexyl | " | 800 | 62.5 | 2.73 | 620 |
| 10 | n-Butyl | Benzyl | " | 800 | 56.5 | 8.92 | 620 |
| 11 | n-Pentyl | n-Propyl | " | 800 | 27.9 | 3.88 | 620 |
| 12 | n-Pentyl | n-Butyl | " | 800 | 50.9 | 3.06 | 620 |
| 13 | n-Pentyl | 3-Methylbutyl | " | 800 | 60.5 | 3.25 | 620 |
| 14 | n-Pentyl | Benzyl | " | 800 | 50.3 | 12.2 | 500 |
| 15 | n-Pentyl | 3-Chlorobenzyl | " | 800 | 123.6 | 10.2 | 500 |
| 16 | 2-Methylbutyl | n-Butyl | " | 800 | 44.1 | 2.85 | 620 |
| 17 | 2-Methylbutyl | n-Pentyl | " | 800 | 52.4 | 3.33 | 620 |
| 18 | 2-Methylbutyl | n-Hexyl | " | 800 | 51.9 | 2.99 | 620 |
| 19 | 2-Methylbutyl | Benzyl | " | 800 | 56.2 | 4.49 | 620 |
| 20 | Benzyl | Phenethyl | " | 800 | 74.6 | 7.73 | 620 |
| 21 | n-Propyl | 2-Methylbutyl | 1,4-Tetramethylene | 800 | 3.9 | 29 | 500 |
| 22 | n-Propyl | 3-Chlorobenzyl | 1,6-hexamethylene | 800 | 147.9 | 13.5 | 500 |
| 23 | n-Butyl | n-Hexyl | 1,6-Hexamethylene | 800 | 51.7 | 5.97 | 500 |

All the imaging members with the invention unsymmetrical photogenerating pigments exhibited acceptable charge acceptance, and in a number of instances evidenced low to moderate dark decay ranging from about 4 to 60 volts per second, and photosensitivities ranging from excellent (E½ of less than 3 ergs/cm$^2$) to moderate (E½ of about 15 ergs/cm$^2$) indicating that these unsymmetrical perylene dimers would be very useful for xerographic imaging applications, especially for xerographic systems with high speeds of in excess of about 70 copies per minute.

Other embodiments and modifications of the present invention may occur to those skilled in the art subsequent to a review of the information presented herein; these embodiments, modifications, and equivalents thereof, are also included within the scope of the present invention.

What is claimed is:

1. A photoconductive imaging member comprising an unsymmetrical perylene, wherein said perylene is of the formula

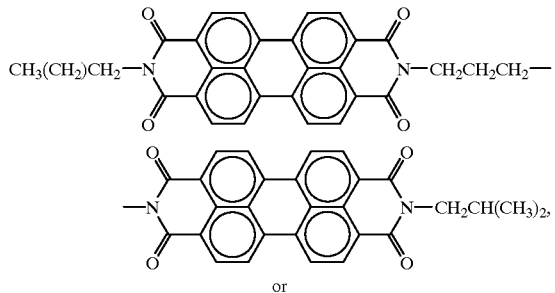

or

-continued

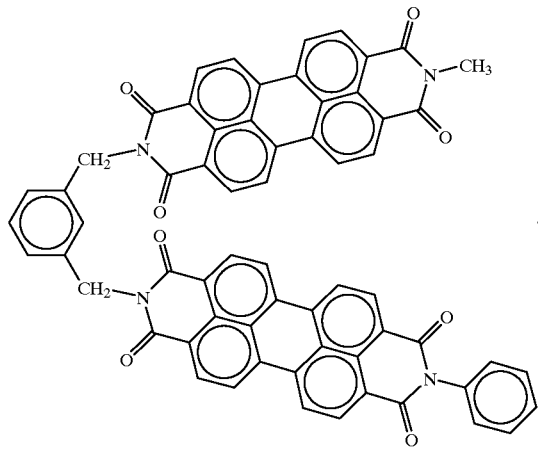

2. An imaging member comprising a supporting substrate, a charge transport layer, and a photogenerator layer comprising a component represented by the formula

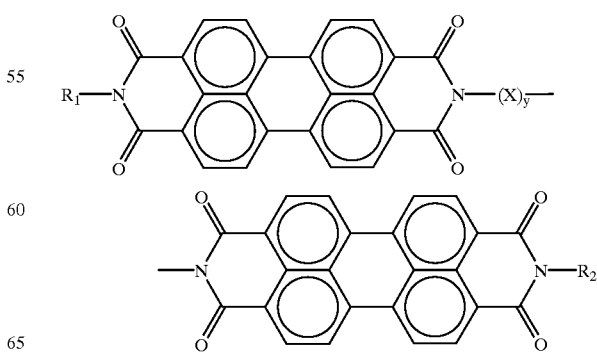

wherein each R₁ and R₂ are dissimilar and wherein said R₁ and R₂ are hydrogen, alkyl, cycloalkyl, substituted alkyl, aryl, substituted aryl, aralkyl, or substituted aralkyl, and X represents a symmetrical bridging component, and y represents an integer from 1 to 6, wherein X is an arylene of biphenyl-2,3-diyl, biphenyl-2,4'-diyl, biphenyl-1,4-diyl, naphthalene-1,3-diyl, naphthalene-1,6-diyl or naphthalene-1,7-diyl; 2-fluoro-, 2-chloro-, 2-bromo-, 2-hydroxy-, 2-methyl-, 2-methoxy-, 2-dimethylamino-, 2-cyano-, or 2-nitro-phenyl; 2-fluoro-, 2-chloro-, 2-bromo-, 2-hydroxy-, 2-methyl-, 2-methoxy-, 2-dimethylamino-, 2-cyano-, or 2-nitro-biphenyl; 3-fluoro-, 3-chloro-, 3-bromo-, 3-hydroxy-, 3-methyl-, 3-methoxy-, 3-dimethylamino-, 3-cyano-, 3-nitro-biphenyl, diphenyl ether-3,4'-diyl, diphenylsulfone-3,4'-diyl; or benzanilide-4,4'-diyl.

3. An imaging member comprising a supporting substrate, a charge transport layer, and a photogenerator layer comprising a component represented by the formula

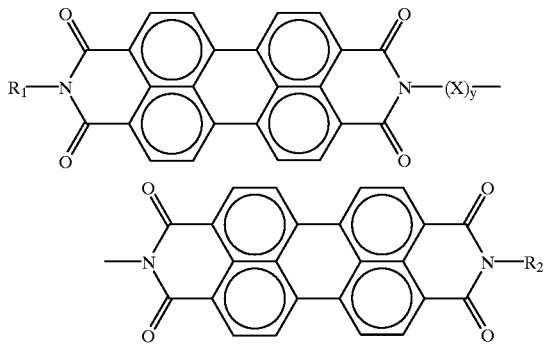

wherein each R₁ and R₂ are dissimilar and wherein said R₁ and R₂ are hydrogen, alkyl, cycloalkyl, substituted alkyl, aryl, substituted aryl, aralkyl, or substituted aralkyl, and X represents a symmetrical bridging component, and y represents an integer from 1 to 6, wherein X is a substituted aralkylene of 2-fluoro-, 2-chloro-, 2-bromo-, 2-hydroxy-, 2-methyl-, 2-methoxy-, 2-dimethylamino-, 2-cyano- or 2-nitro-toluene-a,4-diyl; 2-fluoro-, 2-chloro-, 2-bromo-, 2-hydroxy-, 2-methyl-, 2-methoxy-, 2-dimethylamino-, 2-cyano- or 2-nitro-ethylbenzene-b,4-diyl; or 3-fluoro-, 3-chloro-, 3-bromo-, 3-hydroxy-, 3-methyl-, 3-methoxy-, 3-dimethylamino-, 3-cyano- or 3-nitro-ethylbenzene-b,4-diyl.

4. An imaging member comprising a supporting substrate, a charge transport layer, and a photogenerator layer comprising a component represented by the formula

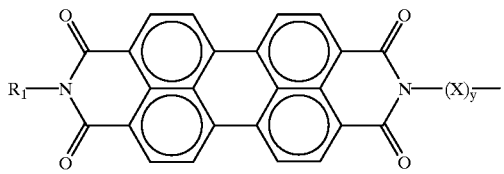

-continued

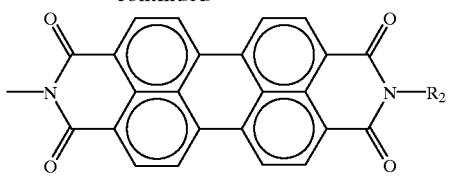

wherein X represents a symmetrical bridging component, and y represents an integer from 1 to 6, wherein R₁ and R₂ are dissimilar and (a) each R₁ and R₂ is hydrogen, methyl, ethyl, n-propyl, 3-methoxypropyl, n-butyl, isobutyl, n-pentyl, 2-pentyl, 3-pentyl, 2-methylbutyl, 3-methylbutyl, neopentyl, n-hexyl, n-heptyl, n-octyl, benzyl, 3-chlorobenzyl, or phenethyl, and X is toluene-a,4-diyl, or X is ethylbenzene-b,4-diyl; (b) R₁ and R₂ are hydrogen, methyl, ethyl, n-propyl, 3-methoxypropyl, n-butyl, isobutyl, n-pentyl, 2-pentyl, 3-pentyl, 2-methylbutyl, 3-methylbutyl, neopentyl, n-hexyl, n-heptyl, n-octyl, benzyl, 3-chlorobenzyl or phenethyl, and X is diphenyl ether-3,4'-diyl; or (c) R₁ and R₂ are hydrogen, methyl, ethyl, n-propyl, 3-methoxypropyl, n-butyl, isobutyl, n-pentyl, 2-pentyl, 3-pentyl, 2-methylbutyl, 3-methylbutyl, neopentyl, n-hexyl, n-heptyl, n-octyl, benzyl, 3-chlorobenzyl or phenethyl, X is benzanilide-4,4'-diyl, and y is one.

5. An imaging member comprising a supporting substrate, a charge transport layer, and a photogenerator layer comprising a component represented by the formula

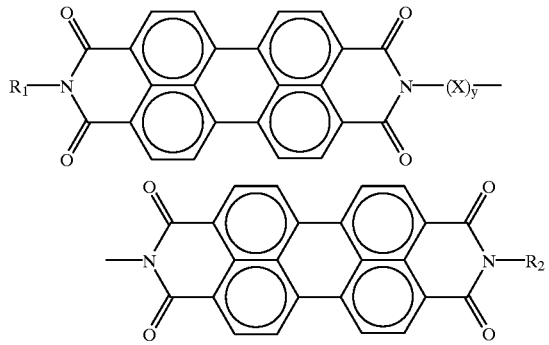

wherein each R₁ and R₂ are dissimilar and wherein R₁ is hydrogen, methyl, ethyl, n-propyl, 3-methoxypropyl, n-butyl, isobutyl, n-pentyl, 2-pentyl, 3-pentyl, 2-methylbutyl, 3-methylbutyl, neopentyl, n-hexyl, n-heptyl, n-octyl, benzyl, 3-chlorobenzyl or phenethyl, R₂ is hydrogen, alkyl, cycloalkyl, substituted alkyl, aryl, substituted aryl, aralkyl, or substituted aralkyl, and X is toluene-a,4-diyl, ethylbenzene-b,4-diyl, diphenyl ether-3,4'-diyl, or benzanilide-4,4'-diyl, and y represents an integer from 1 to 6.

6. A photoconductive imaging member comprising an unsymmetrical perylene of the formula

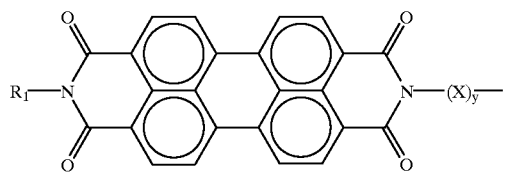

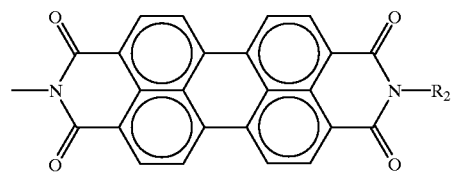

wherein each $R_1$ and $R_2$ are dissimilar and wherein said $R_1$ and $R_2$ are hydrogen, alkyl, cycloalkyl, substituted alkyl, aryl, substituted aryl, aralkyl, or substituted aralkyl, and X represents a symmetrical bridging component, and y represents an integer from 1 to 6, wherein X is

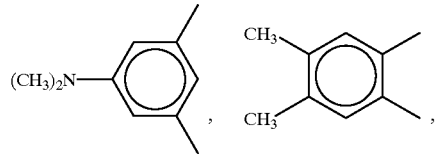

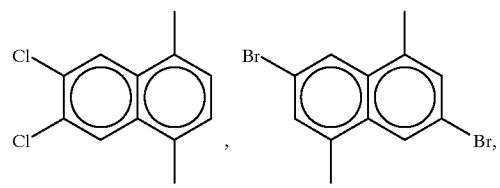

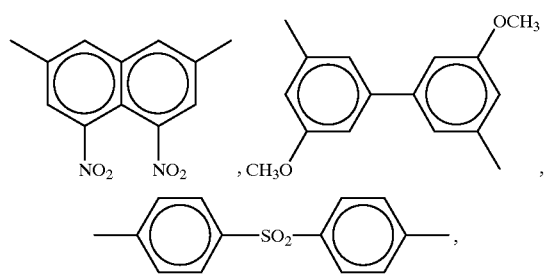

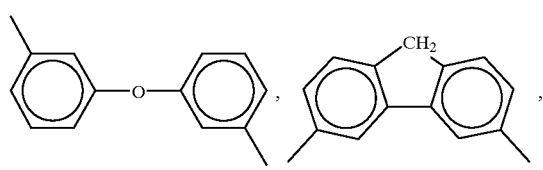

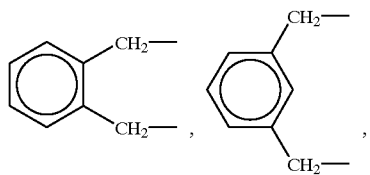

-continued

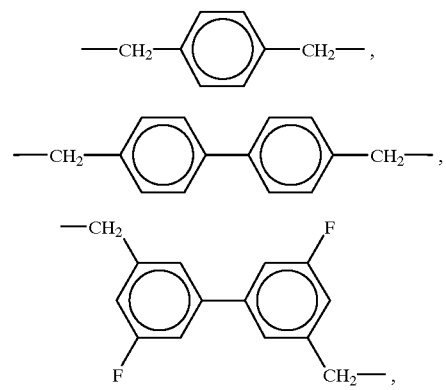

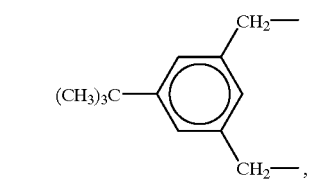

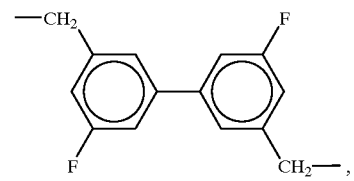

—CH$_2$CH$_2$—, —CH$_2$CH$_2$CH$_2$—, —CH$_2$CH(CH$_3$)CH$_2$—, —CH$_2$C(CH$_3$)$_2$CH$_2$—, —CH$_2$CH$_2$CH$_2$CH$_2$—, —CH$_2$CH(CH$_3$)CH(CH$_3$)CH$_2$—, —CH$_2$CH$_2$CH$_2$CH$_2$CH$_2$—, —CH$_2$CH$_2$CH(CH$_3$)CH$_2$CH$_2$—, —CH$_2$CH$_2$CH$_2$CH$_2$CH$_2$CH$_2$—, —CH$_2$CH$_2$CH$_2$CH$_2$CH$_2$CH$_2$CH$_2$—, —CH$_2$CH(OH)CH$_2$—, —CH$_2$CH(OCH$_3$)CH$_2$—, —CH$_2$CH$_2$CH[N(CH$_3$)$_2$]CH$_2$CH$_2$—,

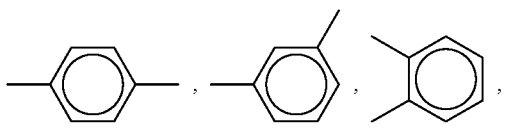

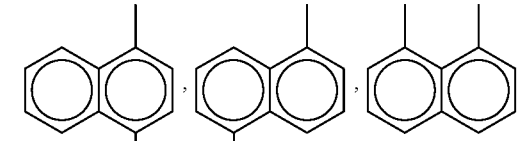

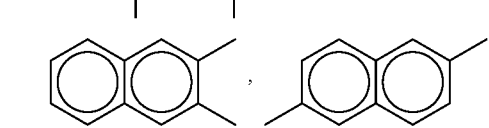

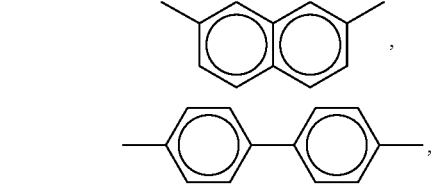

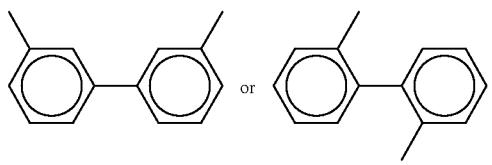

7. A photoconductive imaging member comprising a supporting substrate, a charge transport layer, and a photogenerator layer comprising a component represented by the formula

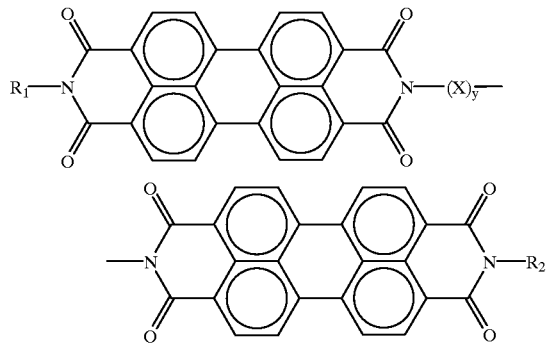

wherein each $R_1$ and $R_2$ are dissimilar and wherein said $R_1$ and $R_2$ are hydrogen, alkyl, cycloalkyl, substituted alkyl, aryl, substituted aryl, aralkyl, or substituted aralkyl, and X represents a symmetrical bridging component, said symmetrical bridging component being an alkylene or a substituted alkylene, and y represents an integer from 1 to 6.

8. A photoconductive imaging member in accordance with claim 7 comprising an unsymmetrical perylene of the formula

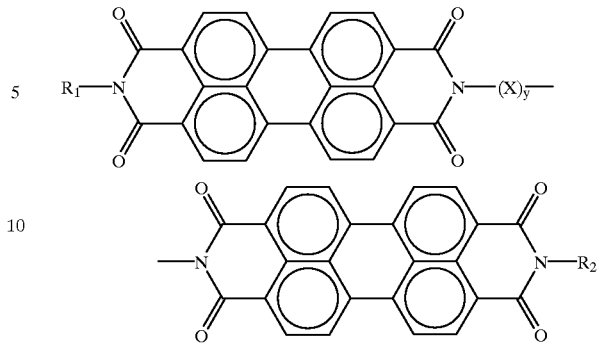

wherein y is 1, $R_1$ is alkyl, $R_2$ is aryl, and X is alkylene.

9. A photoconductive imaging member in accordance with claim 7 comprising an unsymmetrical perylene of the formula

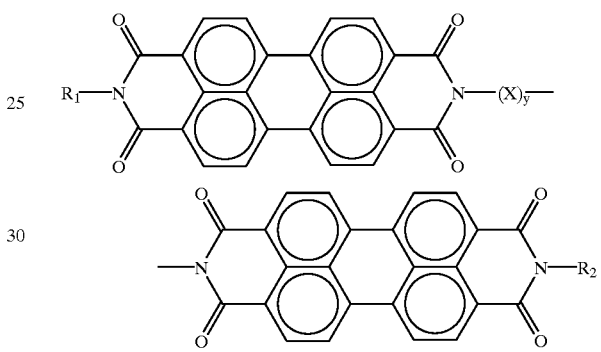

wherein y is 1, $R_1$ is methyl, $R_2$ is ethyl, and X is alkylene.

* * * * *